United States Patent [19]

Ferre et al.

[11] Patent Number: 5,033,489

[45] Date of Patent: Jul. 23, 1991

[54] MANUAL, SELF-CONTAINED, FREE-STANDING, VEHICLE WASHING/CLEANING CENTER

[75] Inventors: F. Budd Ferre; Rowell Sims; Vibert L. Kesler; James B. Mayfield, all of Salt Lake City, Utah

[73] Assignee: Autoglym America Corporation, Salt Lake, Utah

[21] Appl. No.: 511,654

[22] Filed: Apr. 20, 1990

Related U.S. Application Data

[63] Continuation-in-part of Ser. No. 391,226, Aug. 8, 1989, which is a continuation of Ser. No. 226,269, Jul. 28, 1988, Pat. No. 4,880,026.

[51] Int. Cl.[5] ............................................. B60S 3/04
[52] U.S. Cl. ............................. 134/57 R; 15/DIG. 2; 52/79.1; 52/79.5; 134/107; 134/109; 134/113; 134/123; 137/234.6
[58] Field of Search ...................... 137/234.6; 52/79.1, 52/79.5, 79.12; 15/DIG. 2; 134/123, 43, 57 R, 107, 109, 111, 113

[56] References Cited

U.S. PATENT DOCUMENTS

| | | | |
|---|---|---|---|
| 2,021,544 | 11/1935 | Crown | 137/234.6 |
| 3,175,564 | 3/1965 | Baird, Jr. et al. | 134/123 X |
| 3,229,703 | 1/1966 | Thompson et al. | 134/123 X |
| 3,259,138 | 7/1966 | Heinicke | 134/123 X |
| 3,536,109 | 10/1970 | Ginsburgh | 137/234.6 |
| 3,621,869 | 11/1971 | Albarran | 137/234.6 |
| 3,624,852 | 12/1971 | Hanna | 15/DIG. 2 |
| 3,772,723 | 11/1973 | Krimm | 15/DIG. 2 |
| 3,832,811 | 9/1974 | Briel, Jr. | 52/79.5 |
| 4,284,173 | 8/1981 | Patterson | 137/234.6 |
| 4,594,817 | 6/1986 | McLaren et al. | 52/79.12 |
| 4,637,179 | 1/1987 | Bigelow, Jr. et al. | 52/79.5 |
| 4,726,157 | 2/1988 | Holt et al. | 52/79.5 |
| 4,732,186 | 3/1988 | Nishikawa | 134/123 |

FOREIGN PATENT DOCUMENTS

| | | | |
|---|---|---|---|
| 0104442 | 6/1982 | Japan | 137/234.6 |
| 6706366 | 11/1967 | Netherlands | 15/DIG. 2 |

OTHER PUBLICATIONS

"This is the Super 19" from *Auto Laundry News*, p. 29; Oct. 1969.

*Primary Examiner*—Philip R. Coe
*Attorney, Agent, or Firm*—Lynn G. Foster

[57] ABSTRACT

A transportable, self-contained work site, designed specifically to facilitate manual vehicle washing and engine cleaning, comprising a rigid skeletal structure which is constructed of preformed, connectable modules and a lightweight raised platform or flooring which slopes inwardly to capture liquids for recycling. The structure and platform define a single vehicle work bay or site which further comprises cabinets situated about the periphery of the bay used to store and protect equipment and products from liquid spray and splash, a liquid recycling system which receives and reclaims liquids captured by the flooring thereby minimizing water usage and eliminating the need for linkage with a drain or sewer, two varieties of lights which illuminate the vehicle elucidating unwashed spots, pumps and compressors providing self-contained on-site sources of fluid pressure, an electrical system comprising timers and sensors which activate and deactivate pumps at preset times to conserve water and energy, plumbing for liquid and air lines providing delivery of pressurized fluids at convenient locations about the bay, fans to remove fumes and cool operating personnel, and retractable hoses and nozzles providing mobile, pressurized sources of rinse water and cleaning chemicals. The work site is readily disassembled and transported to more favorable locations. Disassembly is facilitated because the structure is not in any way anchored to the floor or ground upon which it rests and the flooring is modular and also easily disassembled and moved. The work site's electrical and water replenishing systems require only connection to conventional outlet source for operation.

62 Claims, 12 Drawing Sheets

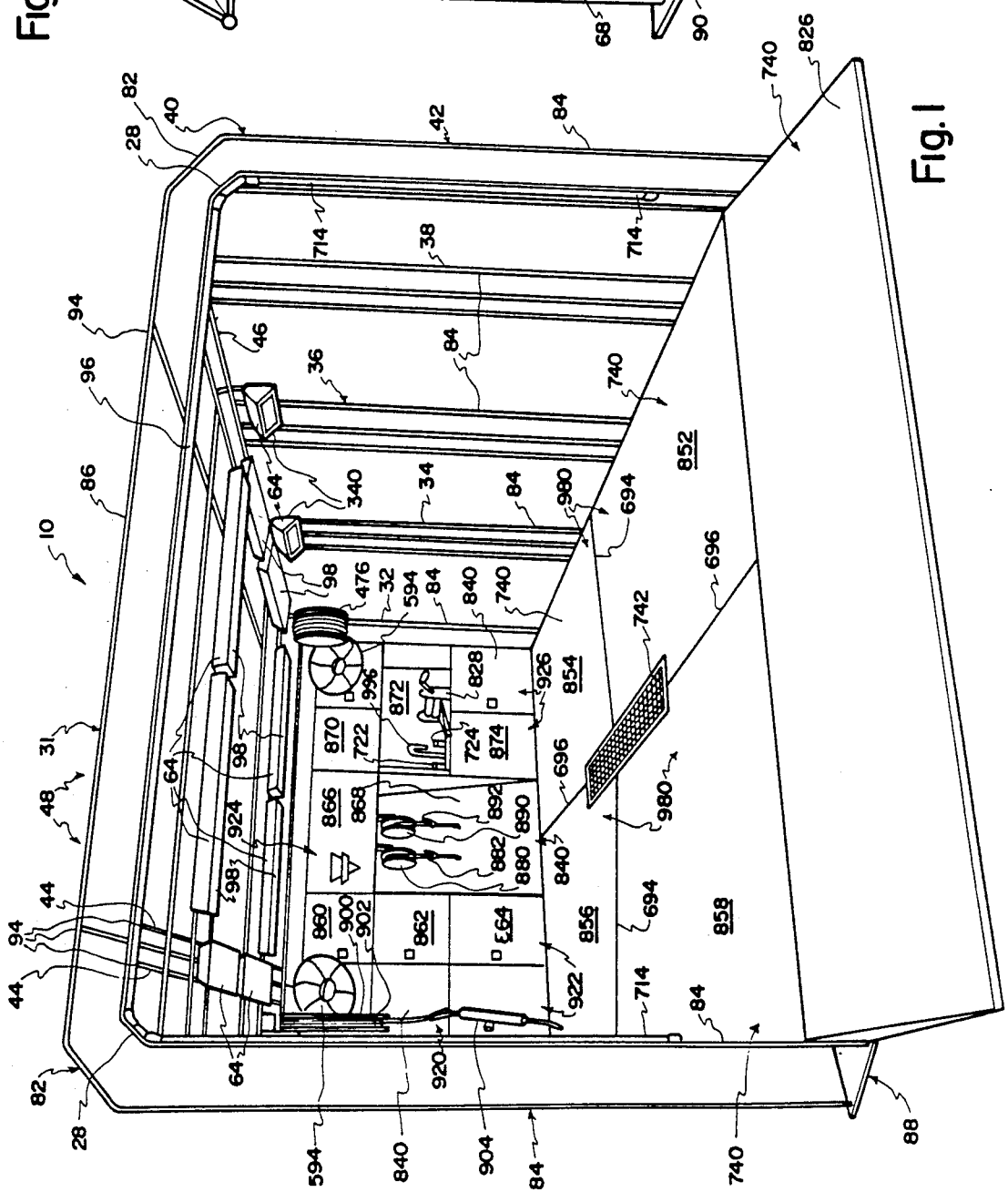

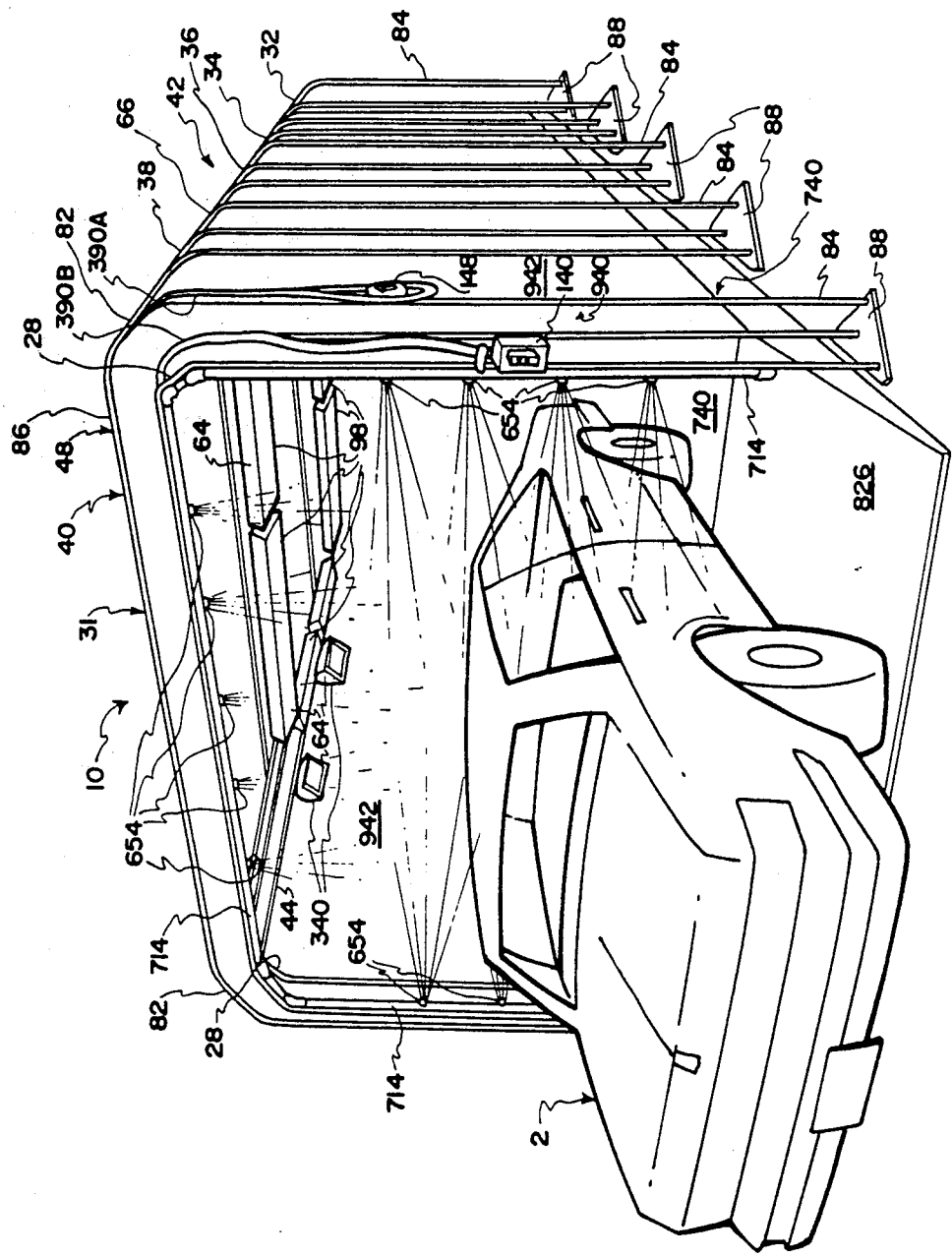
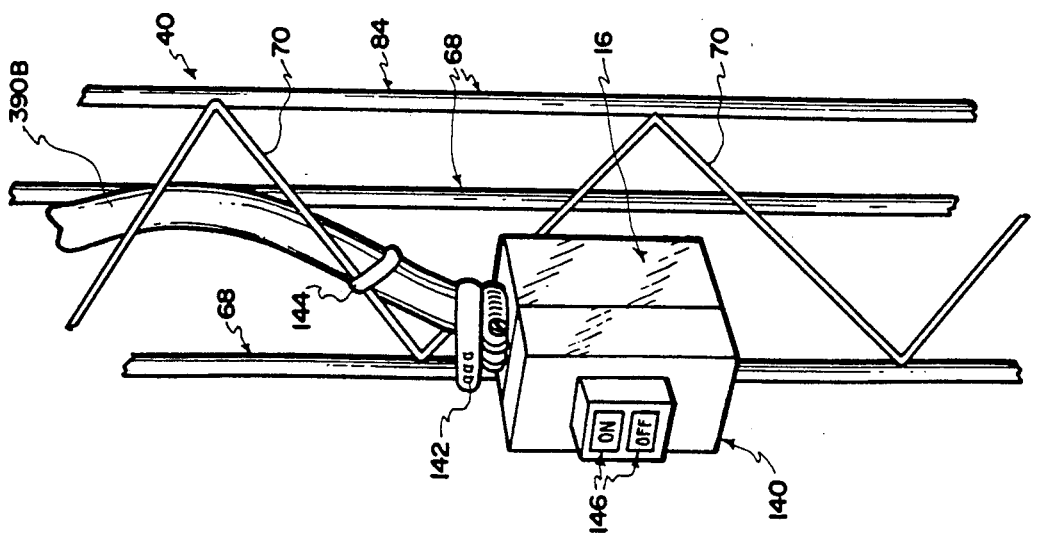

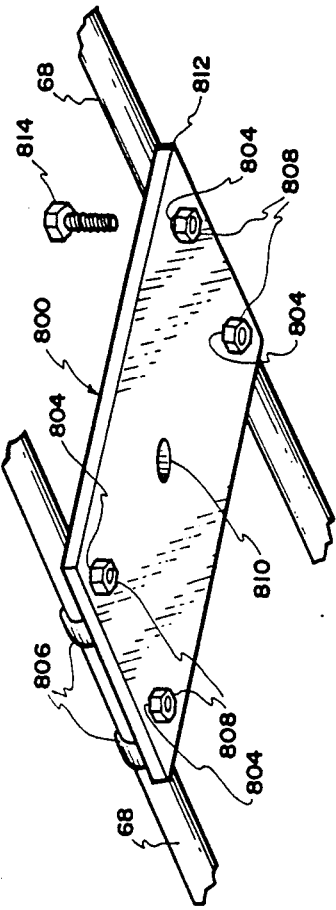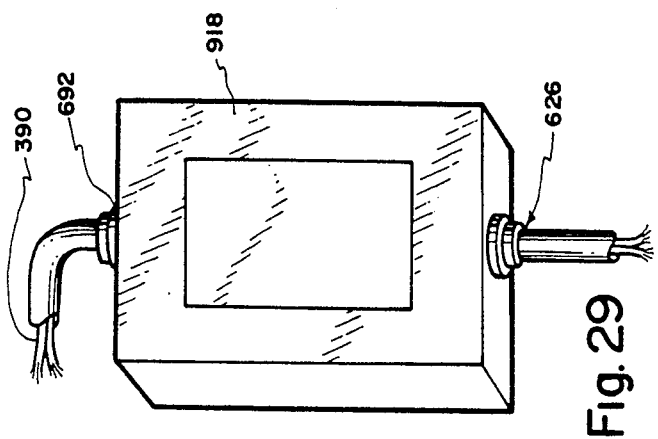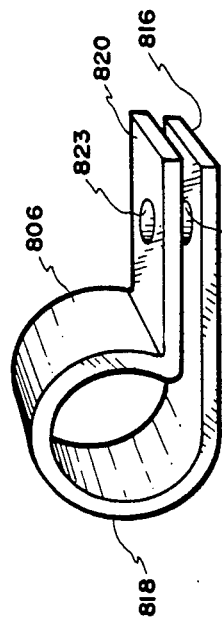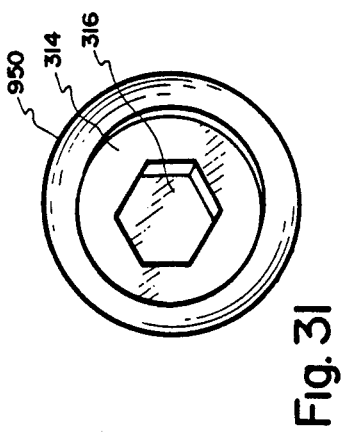

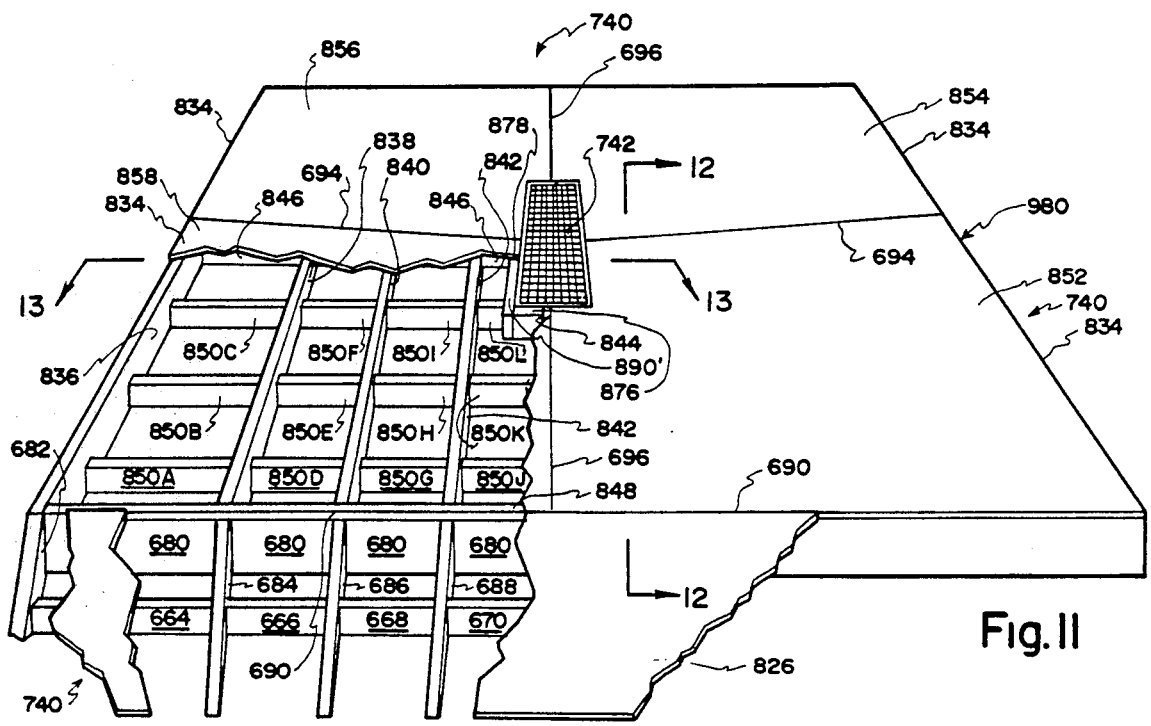
Fig. 11
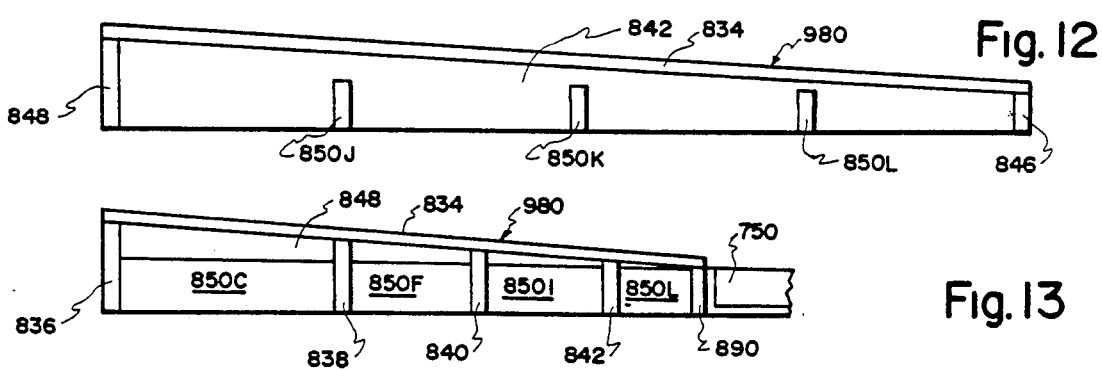
Fig. 12
Fig. 13
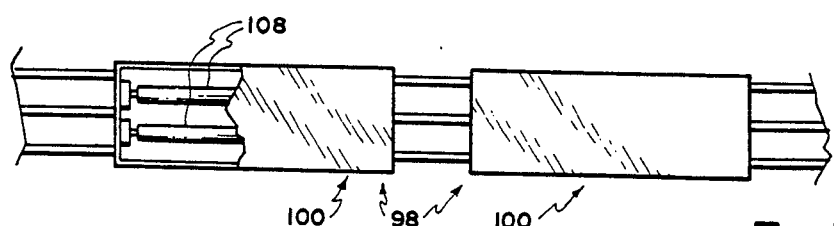
Fig. 14

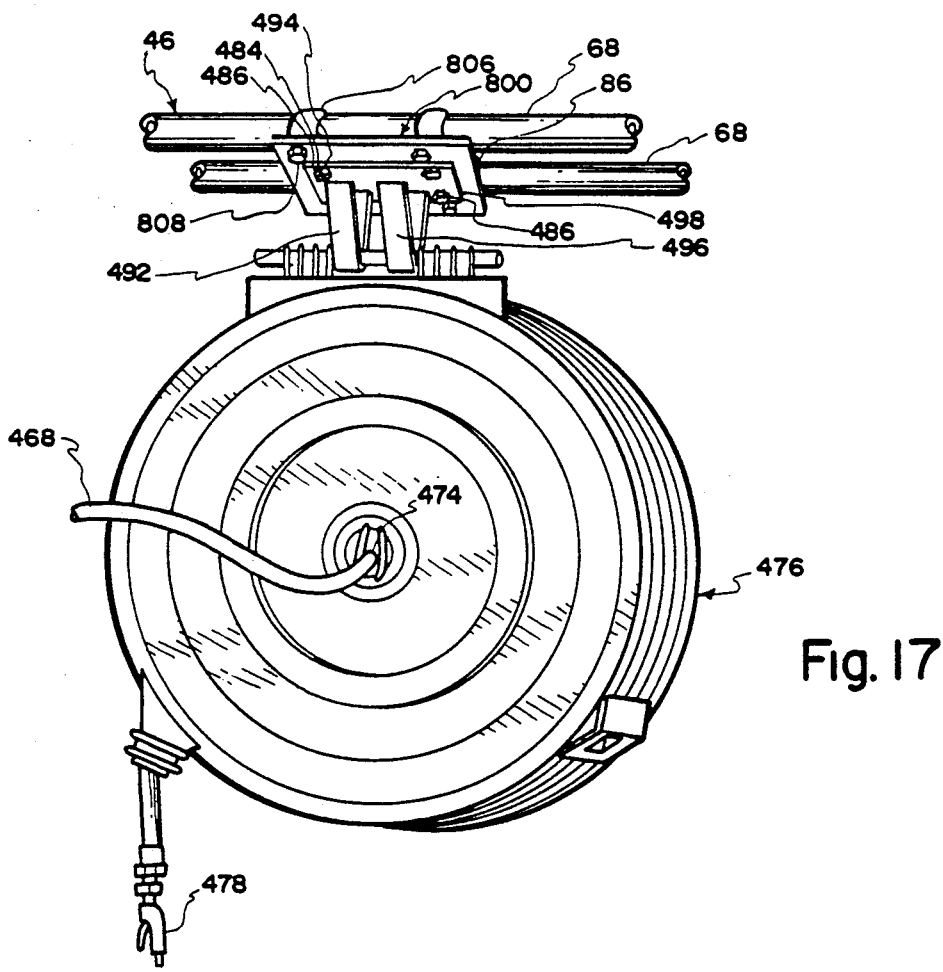
Fig. 17
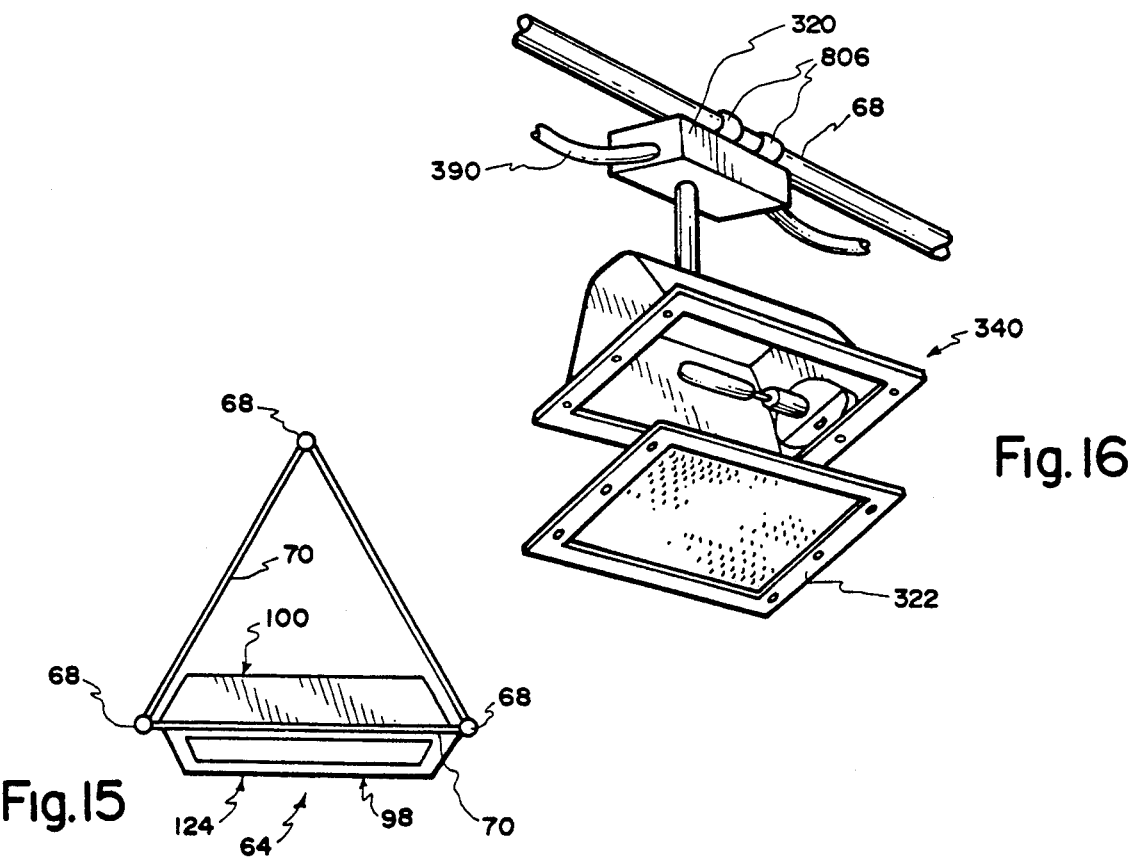
Fig. 16
Fig. 15

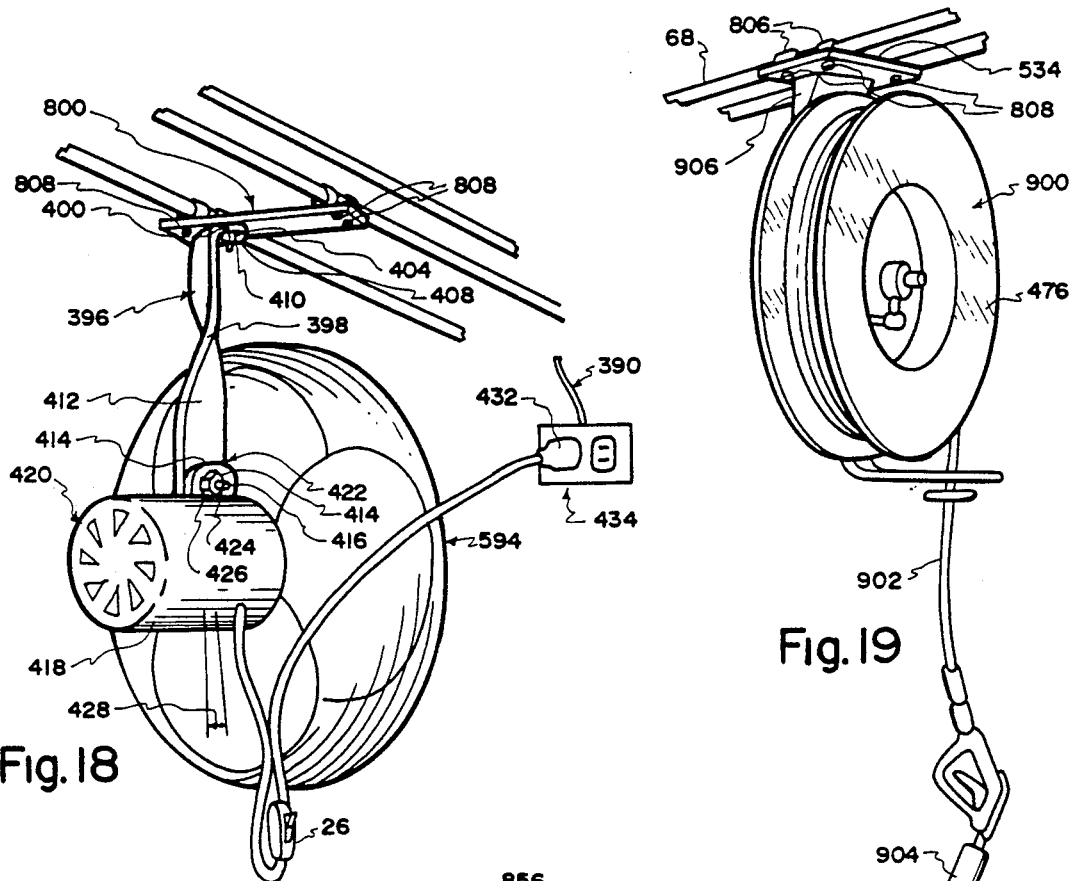
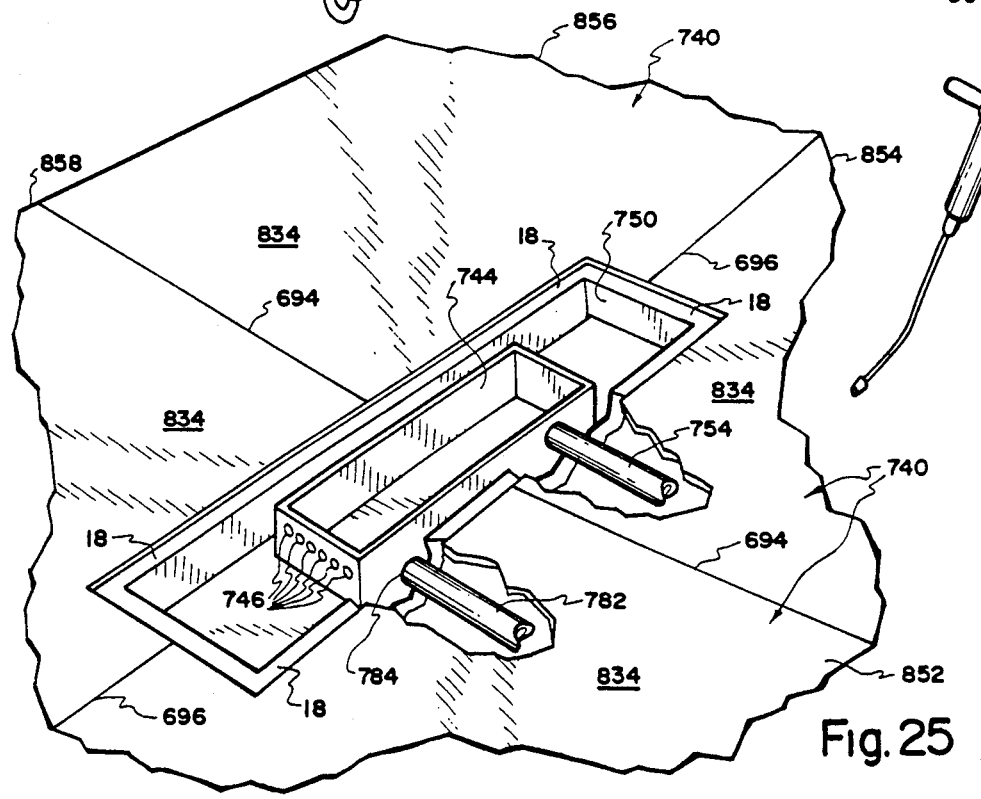

Fig. 24

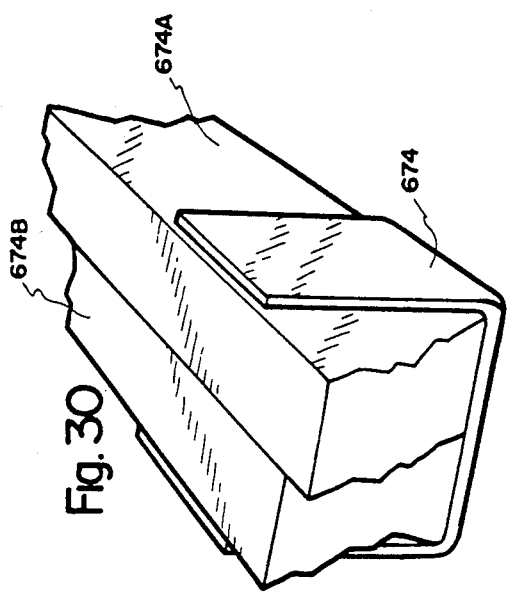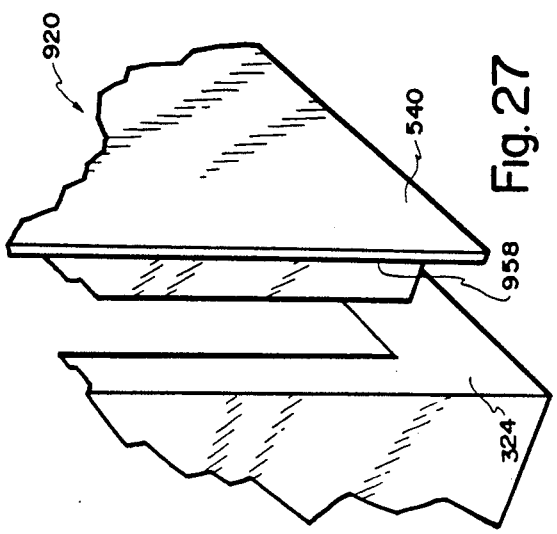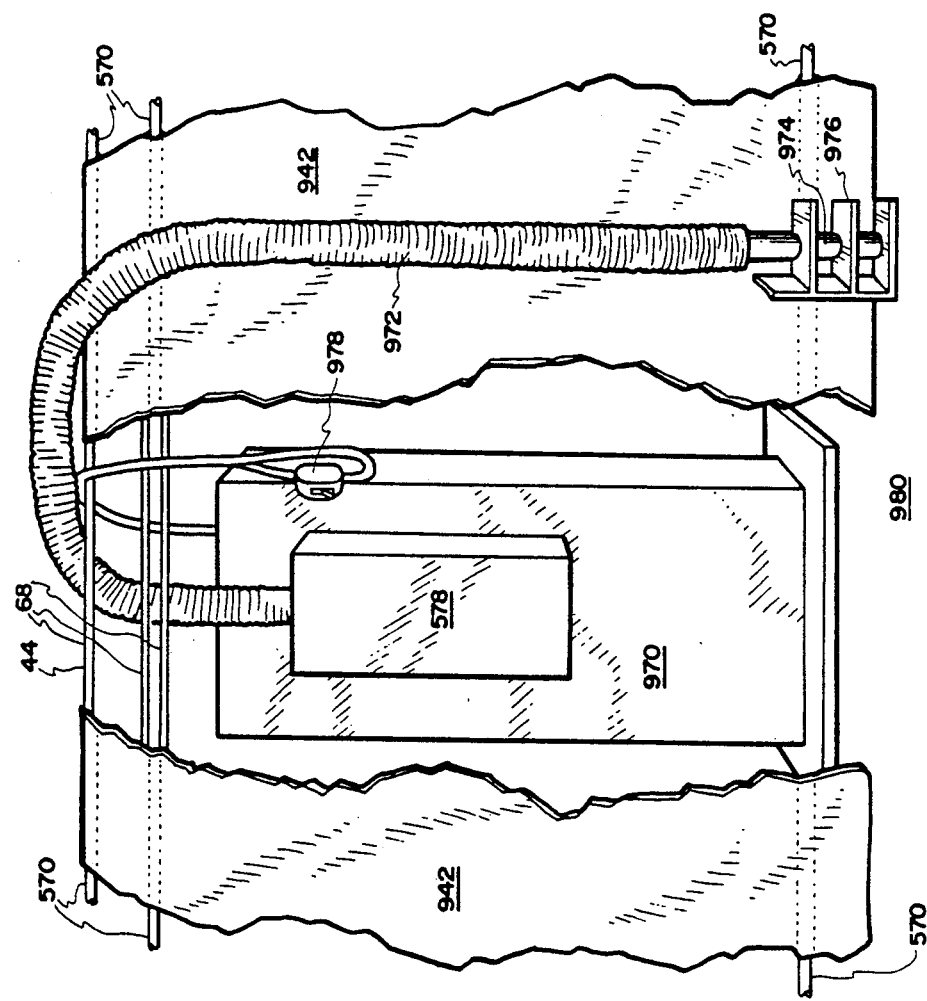

MANUAL, SELF-CONTAINED, FREE-STANDING, VEHICLE WASHING/CLEANING CENTER

CONTINUITY

This application is a Continuation-in-Part of copending application Ser. No. 391,226 filed Aug. 8, 1989 which is a continuation of application Ser. No. 226,269, filed July 28, 1988, now U.S. Pat. No. 4,880,026, dated Nov. 14, 1989.

FIELD OF THE INVENTION

The present invention relates generally to vehicle exterior and engine cleaning and more particularly to a novel self-contained, readily transportable free-standing work bay or service center where the exterior and engine of a vehicle is efficiently and carefully manually hand cleaned to preserve paint and protect against scratching, and all liquids, other than those lost to evaporation, are captured and recycled, providing a stand-alone, lightweight, water and energy efficient cleaning system which is installable where the need to provide such cleaning is located. The invention is environmentally friendly since it is intended to conserve water and to reduce pollutants released into the atmosphere.

PRIOR ART

Manual and automatic car cleaning work bays are known. Automatic facilities generally comprise rotating and moving brush systems which can damage the exterior of a vehicle as the brush systems deteriorate with age motivating caring owners of cars to continue to use manual washing methods which are not as likely to harm an exterior finish. Two mobile automatic car washing systems are known. The first, disclosed in U.S. Pat. No. 3,624,852, discloses an automatic modular car wash which permits assembly of a complete car wash including the building and all the car washing equipment in less than eight hours. The second, disclosed in U.S. Pat. No. 3,772,723, is a mobile wash unit which is carried on a transportable drive-through frame for use in plant or office site parking lots and the like. No similarly portable manual vehicle washing system is known. Generally, prior art manual washing systems are of rudimentary design, employing simple brush and nozzle tools. Servicing fluids available in prior art washing systems are usually restricted to water, soapy water, and water based waxes, all usually provided from the same nozzle source. In manual washing systems, detail work, such as drying and wiping and polishing with a chamois or other drying and polishing material, is usually not planned for or performed inside the wash bay. Manual wash bays are commonly stark providing little or no space and cabinets for storage of cleaning implements and chemicals. Other than hangers for mats, little drying equipment is available. Prior art site facilities are commonly permanent structures comprising concrete floors with drains to sewers or water collection and processing systems. The permanent nature and potential of water pollution usually requires initial governmental approval and on-going long term supervision and expensive initial construction, producing a nontransportable service bay. Water consumption in current manual washing systems is normally in excess of 100 gallons per washed car and usually in the most sophisticated car washes is water recycled. Lighting in such bays is generally inadequate for exterior detailing and close inspection. Ventilation is limited to free airflow through bay entry and exit ports and generally does not meet safety standards for use of solvents used within the bay. Further deficiencies of the prior art are lack of ample storage space, especially absence of suitable storage facilities for auto servicing products, limitation in modes of use, and the requirement, especially in an earthquake prone region, of a permanent floor and drainage system.

BRIEF SUMMARY AND OBJECTS OF THE INVENTION

In brief summary, this novel invention overcomes or substantially alleviates the prior art problems and provides a novel, portable, self contained, manual vehicle washing and engine cleaning center. The presently preferred vehicle washing and engine cleaning center comprises a free-standing structure formed of a plurality of interconnected frame members with unanchored self-sustaining ground or floor engaging structure, the frame members being preferably arranged into an open framework or assembly so as to collectively form an effectual tunnel or bay, although closed frameworks are within the purview of the invention. A lightweight flooring structure is disposed inside the free standing framework providing a raised floor which slopes centrally to catch residue from washing and cleaning and, thereby, provide drainage to an integral water and solvent recycling system, limiting the water used to substantially that which evaporates during the washing process. Retractable hose facilities connected to pressurized sources are provided for facile movement around the periphery of a vehicle when spraying fluids used in washing and rinsing, applying special road grime removing solvents, delivering engine cleaning chemicals under controlled conditions which materially limit the amount of chemicals used, releasing jets of compressed air to remove hard &o dislodge liquids and other materials during and following the cleaning process, and blowing air across a vehicle for more rapid surface drying. Fans are provided to safely ventilate the bay when required to eliminate odors and vapors and for personnel cooling when the temperature is uncomfortably high.

Two different types of spray and splash protected lighting systems provide safe and adequate lighting for normal working conditions and higher illumination for inspecting work results before the vehicle leaves the bay. Locked spray and splash obstructing cabinets providing for critical equipment storage and a double sided display sign are disposed either at the head or either side of the bay for storage and facile access. Both ends of the tunnel array of frames may be open where a drive-through format is desired. One or more vehicle wash and engine cleaning centers may be efficaciously used jointly with a vehicle detailing and service center as described by U.S. Pat. No. 4,880,026. The two types of centers may be disposed end to end where a just washed vehicle is made immediately available for detailing. Two or more vehicle washing and engine cleaning centers may be in the same vicinity, such as side-by-side where one water recycling system may be placed at a common interface, such as between the centers, for joint use. Water pumps, water heaters, air compressors, solvents, chamois wringers and drying hooks, hoses and hose retractors are carried by the cabinetry or framework for convenient selective access and use. Self-contained plumbing and electrical systems for the wash and cleaning center are provided and may be readily connected to any commercial or household source of electrical power and water.

A distinct advantage of the present invention over the prior art is its free-standing nature. It is also highly transportable, having the capability of being assembled and disassembled with relative ease and transported from place to place as needed or desired. When a light weight structural approach is taken, the ease of transporting and installing is enhanced. The washing and cleaning center may be installed indoors or out-of-doors without structural permanency. Its low-weight flooring allows installation where systems requiring heavier flooring, such as concrete, would exceed the bearing load capacity of a structure, barring such use. Its self-contained water recycling systems allows its use where discharge of washing or cleaning effluent would be improper.

In its presently preferred form, the vehicle to be cleaned is driven into and parked in the free-standing washing and cleaning center tunnel. The exterior of the vehicle and its engine may be cleaned by one or more of three different processes.

Using sponges and brushes, cleaning solutions comprising soaps and solvents are efficiently hand applied and the vehicle is manually rinsed clean using a hand-held wand connected to a first pressurized source of rinse water through a retractable hose. The car may be hand dried using chamois or other suitable material or blown dry with a hot air blower. Before delivery of the vehicle from the bay, it is inspected under an array of lights sources directed upon the vehicle in a manner which eliminates shadows to best reveal missed spots and areas requiring rework.

A retractable hose, connected to a second pressurized source comprising engine cleaner, is used to direct cleaner comprising a cold water solvent over the engine of the vehicle. The surface of the engine and related parts are thus cleansed to a nearly new appearance.

For vehicles which have accumulated layers of road grime which are otherwise difficult to remove, road grime cleaners are available from a third pressurized source.

Liquid retained in hard to wipe and dry spots on the vehicle and the engine of the vehicle is dislodged and blown to areas of easier access by a jet from an air compressor nozzle attached to an air compressor through a retractable hose. With the exception of liquid lost to evaporation, all fluid effluent from the three processes and other fluid sources within the center is collected and returned the self contained treatment system for recycling.

The service center is preferably equipped with a built-in stereo sound system for the benefit of the workers, which precludes use by the workers of the radio, cassette and sound system of the vehicle being serviced. Upon completion of the vehicle servicing, the vehicle is removed from the bay and the cleaning and washing center is ready for the next vehicle.

With the foregoing in mind it is a primary object to provide a free-standing, portable, self-contained manual washing and cleaning center for cleaning vehicle exteriors and engines.

Another significant object is to provide a free-standing readily transportable and easily assembled and disassembled washing and cleaning center without structural permanency for washing vehicle exteriors and cleaning vehicle engines.

A further significant object is to provide a vehicle washing and engine cleaning center which can be quickly placed in use and which is self contained such that water use and disposal permits, if needed, are readily acquired.

A further important object is the provision of a totally self-contained, manual washing and cleaning center for vehicles and vehicle engines in which an open framework of interconnected frame members and raised base or flooring form a tunnel traversing both sides, support surface and top of the vehicle, the frame work and flooring carrying essentially all service equipment needed which may include but is not limited to self-contained lighting, ventilation, pressurized liquid retractable hoses, compressed air, plumbing, electrical wiring and switches, waste liquid collection and recycling, and other important features.

It is a further paramount object to provide a novel integrated vehicle service center for manually washing vehicle exteriors and cleaning vehicle engines having one or more of the following features and advantages: self-contained, efficient, convenient, flexible, well organized, light weight, secure, environmentally friendly, facile provision and access to service equipment and products, low energy consumption, low water consumption, minimal generation, liquid collection and recycling, free-standing, adaptable for a variety of configurations and which can be placed in service in a matter of hours without permanent construction changes to buildings and with minimal long delays in availability.

It is a further fundamental object to provide cabinetry for a totally self-contained manual vehicle washing and engine cleaning center which protectively stores compressors, water heaters, electrical pumps, cleaning chemicals, and the like while forming a liquid spray and splash obstruction, which can be used in place of a spray or splash containment curtain, to inhibit escape of liquid from the center thereby providing for the capture and recycling of used liquids.

It is a basic object to provide a self-contained, free-standing service center which contains and recycles wash liquid for the purpose of conserving fresh water and reducing or eliminating effluent pollutants released to the environment.

These and other objects and features of the present invention will be apparent from the detailed description taken with reference to accompanying drawings.

BRIEF DESCRIPTION OF THE DRAWINGS

FIG. 1 is a frontal perspective of a preferred manual washing and cleaning service center or bay shown in assembled position and comprising a flooring with an associated grating above a drain sump in place, according to the present invention;

FIG. 2 is a frontal perspective of the center or bay showing a vehicle entering the bay while spray is issuing from a spray arch disposed at the entrance;

FIG. 3 is a sectional view of a front column of the bay showing an attached control switch which is used to start a timer which applies power to a high pressure water rinse pump;

FIG. 7 is an enlarged cross sectional view of the module comprising structural components of the washing and cleaning center;

FIG. 8 is a perspective fragmentary illustration of the module of FIG. 7 shown attached to a free-standing base plate which supports the service center of FIG. 1 against the floor or ground upon which it rests;

FIG. 9 is a perspective view of a mounting plate used attach equipment overhead in the service center;

FIG. 10 is a mounting strap used to attach the mounting plate of FIG. 9 to frame structures;

FIG. 11 is a perspective of the flooring of the service center with sections cut away to show construction detail and for clarity of presentation;

FIG. 12 is a longitudinal cross section along lines 12-12 of FIG. 11;

FIG. 13 is a lateral cross section along lines 13-13 of FIG. 11;

FIG. 14 is a fragmentary bottom plan view, partially broken away for clarity, of two modules into which certain lighting units have been integrated;

FIG. 15 is an enlarged cross-section along lines 15-15 of FIG. 14;

FIG. 16 is a fragmentary perspective representation of one halogen light source, shown with frOnt protecting lens removed and offset from the picture for clarity;

FIG. 17 is a side elevational view of a retractable air compressor hose and valve unit of the service center of FIG. 1;

FIG. 18 is an elevational rear view of one of two fans in the service center attached to the frame by the mounting plate of FIG. 9;

FIG. 19 is an elevational view of a retractable high pressure hose assembly and wand attached to the frame by the mounting plate of FIG. 9;

FIG. 24 is a schematic diagram of the service center's water distribution and liquid recirculation system;

FIG. 25 is a fragmentary perspective view of the lowest portion of the flooring with the grating removed to show details of a sump, baffle, and attachment to effluent and influent drain tubes;

FIG. 27 is a fragmentary perspective view of a corner of a door of the cabinets shown in FIG. 20 showing the protective edge around each door which overhangs the cabinet frame and impedes splash and spray from entering the cabinets;

FIG. 28 is a perspective illustration of a vehicle blow dryer located at a side of the washing and cleaning center and blow dryer hose and off-on switch positioned inside the bay for facile use, with a portion of the protective spray and splash curtain removed for clarity;

FIG. 29 is a perspective illustration of an electrical junction box which provides on-off switching control and origination of electrical distribution throughout the service center; and FIG. 30 is a perspective of a U-shaped clamp into which flooring cross members are compressibly placed to join sections of the flooring together.

FIG. 31 is a limited perspective view of an eyelet, washer, bolt combination used to anchor the curtain of FIG. 26 to a cabinet.

DETAILED DESCRIPTION OF THE ILLUSTRATED EMBODIMENT

Figure 5:
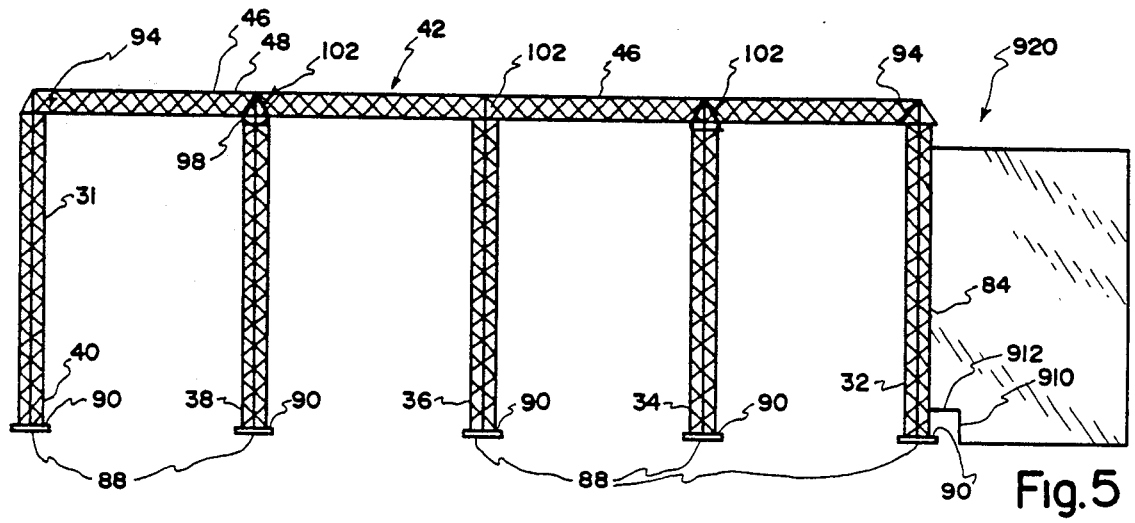
FIG. 5 is a side elevational view of the service center frame of FIG. 1 showing position of the cabinets at the rear of the center.

Reference is now made to the drawings, wherein like numerals are used to designate like parts throughout. A presently preferred free-standing, manual, vehicle washing and cleaning work unit or service center, generally designated 10 and implementing the principles of the present invention, is best illustrated by FIGS. 1-6. Any number of service centers 10 may be used in any desired arrangement at a given location. Work unit 10 comprises an open framework 31 illustrated as comprising a plurality of inverted U-shaped structural frames 32, 34, 36, 38 and 40 and aligned so as to collectively form a nonenclosed tunnel or bay 42 into which a vehicle may be driven. If desired the framework may be totally or partially covered. Preferably liquid carrying hoses, compressor lines, electrical wiring and the like are routed through the components of the framework 31. Two pair of longitudinal braces 44 and 46, run the length of the bay 42, along its crest 48, and rigidly connect the members 32, 34, 36, 38 and 40 together at each connecting position 80 placed inward from the two elevated corner sites formed by ninety degree elbow modules 82. Three display and storage cabinets 922, 924 and 926, generally designated 920, are illustrated as being located respectively at one end of the bay 42. However, both ends of the service center may be open and the cabinets located along and/or parallel to the sides of the framework where a drive-through approach is desired. An array of light sources 64 are mounted on the framework 31. Other machinery, implements and products useful, if not essential, in washing and/or cleaning parts of vehicles, hereinafter described in greater detail, are also stored, displayed and/or supported on, in or about the bay 42 in a well organized fashion for facile access and use.

It is presently preferred that all components of the framework 31 forming the service center 10, except the cabinets 920, comprise members selected from the Structural Space Frame System. Structural is the registered trademark of Targetti Sankey, S.P.A., Florence, Italy and Structura frame members are distributed by Lightolier, Inc., headquartered in Secaucus, New Jersey. The Structura Space Frame System is a network of modular, three dimensional steel frames that can be arranged in any of a multitude of configurations to define space and that can carry a variety of loads. The basic Structura module 66 is presently preferred for framework 31 and has an equilateral triangular cross-section, as best shown in FIGS. 7 and 8. Structura module 66 comprises three relatively long 9/16 inch diameter rods 68 running parallel to each other that form the corners of the triangular cross-section, and a plurality of 5/32 inch diameter W-shaped stringers 70 rigidly connecting the rods 68 together at spaced intervals and forming the sides of the triangular cross-section. The rods 68 are each about 9⅞ inches apart. While the Structura System is preferred at this time, other structural support systems and materials may be substituted without changing the scope or nature of the present invention. For example, standard structure components may be welded or otherwise secured together to form a suitable framework.

Figure 4:
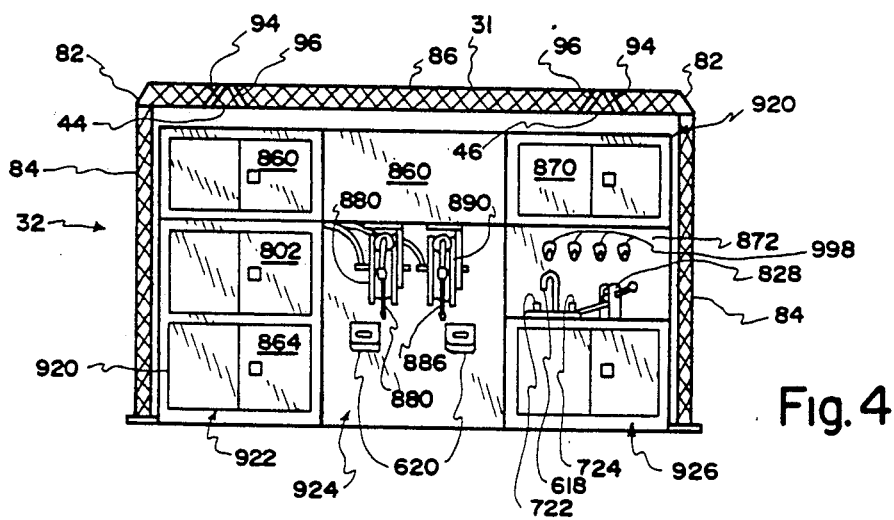
FIG. 4 is a frontal elevational view of the washing and cleaning center of FIG. 1 illustrating a typical inverted U-shaped frame as well as cabinets, with spray protecting doors in closed position, located in the rear of the center.

Each of the inverted U-shaped frames 32, 34, 36, 38 and 40 is illustrated as comprising a series of basic Structura modules 66 assembled into the preferred shape. All modules are rigidly connected together by a system of spring-loaded splines 72. Two ninety degree elbow modules 82, also available from Structura, facilitate the transition between each vertical (column) 84 and horizontal (beam) 86 portions of each U-shaped frame 32, 34, 36, 38 and 40, as shown in FIGS. 1, 2, and 4. An inner transitionary member 28 of elbow module 82 provides an important attachment apparatus for a spray and splash curtain or tarpaulin 948, to be described in detail later. A flat triangular, steel, ground, floor or pavement-engaging base plate 88, also available from Structura, is attached to each open end of each U-shaped frame 32, 34, 36, 38 and 40. Thus, the framework 31 is freestanding. This facilitates rapid installation and use without compromising safety. Each base plate 88 connects to the rods 68 of module 66 of the associated column 84 at a top flat surface 90 of the plate 88 by using a spline 72, while the lower surface 92 lies contiguous with the floor or ground upon which the work unit 10 rests. Thus, plates 88 are bearing or load-transferring plates. Each inverted U-shaped frame 32, 34, 36, 38 and 40 has a preferred height from base plate 88 to crest 48 of approximately nine feet and a preferred width between each base plate 88 of approximately twelve feet four inches for servicing standard sized vehicles. The total length of bay 42 is preferably approximately 24 feet including cabinets 920. These dimensions are easily changed to accommodate larger or smaller vehicles.

The two inverted U-shaped frames 32 and 40, situated at the respective ends of the bay 42, are of identical construction, but opposite hand. Both comprise two base plates 88, two uninterrupted vertical or column portions 84, and a horizontal or beam portion 86 comprising a series of linearly connected basic modules 66 and two T-joint modules 94, available from Structura. Each T-joint modules 94 facilitates the connection of three Structura modules such that two of the modules are linearly connected while the third is connected thereto at a right angle. The third connection site comprises stem 96. See FIGS. 1 and 6. Both T-joints 94 on transverse frames 32 and 40 form the ends of the beam portion 86 and are fastened at one of the transversely-directed connections directly to one of the ninety degree elbows 82. The stem 96 of each T-joint 94 is directed axially parallel to the bay 42. Each stem 96 on member 32 is linearly aligned with its counterpart stem 96 directly opposite on member 40.

Figure 6:
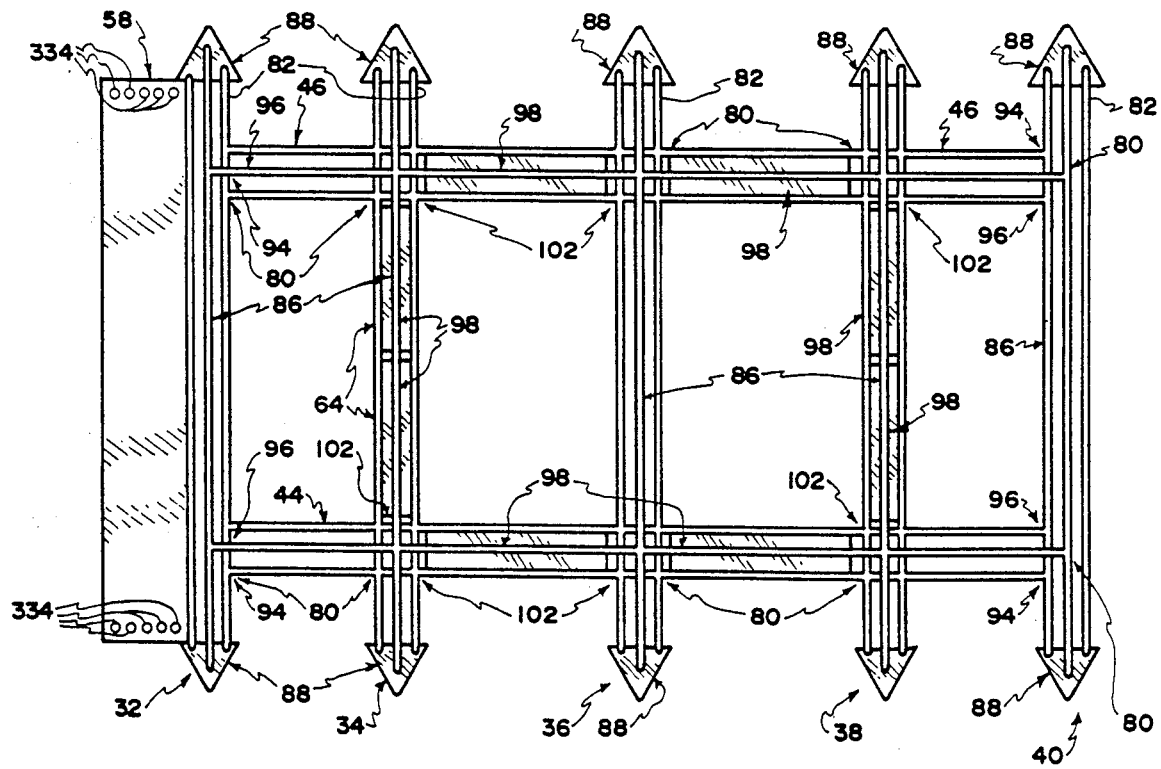
FIG. 6 is a top plan view of the service center of Figure 1 showing position of the cabinets at the rear of the center.

Inverted U-shaped frames 34, 36 and 38 are of identical construction. Each comprises two vertical columns 84 and a horizontal beam 86. Each vertical column 84 comprises a base plate 88 and a series of linearly assembled basic Structura modules 66. Basic modules 66 make up the upper portion of the vertical columns 84. Each horizontal beam 86 comprises a basic module 66 and two X-joint modules 102 as best seen in FIG. 6. Each horizontal beam 86 of U-shaped frames 34 and 38 comprise two specialized lighting modules 98. Each X-joint 102 facilitates the connection of four Structura modules such that a ninety-degree intersection is formed. One transversely-directed end of each X-joint 102 is connected to an elbow module 82 and the opposite end to module 66 comprising beam 86. The X-joints 102 thus comprise the ends of the horizontal beam 86 of frames 34, 36 and 38. At the second transverse end of each frame 34 and 38 X-joint module 102 a specialized lighting module 98 is attached. The fluorescent lighting element 100 is directed downward so as to light the interior of the bay 42. A basic module 66 carries the two light modules 98 on the horizontal beams 86 of frames 34 and 38. The two axially-directed ends of each X-joint module 102 are linearly aligned with and connect to the axial beams which horizontally join frames 34, 36 and 38 to each other and to frames 32 and 40 to form longitudinal or axial beams 44 and 46.

The longitudinal or axial beams 44 and 46 are of identical construction but of opposite hand and span between the T-joints 94 and X joints 102 located on the horizontal beams 86 of inverted U-shaped frames 32, 34, 36, 38 and 40. Beam members 44 and 46 connecting members 32 and 34, and members 38 and 40 comprise only basic Structura modules 66. Each beam member 44 and 46 disposed between inverted U shaped members 34 and 36, and 36 and 38, comprise a light module 98 containing lighting element 100 and carried by basic module 66. Thus, the combination of eight light modules in beam members 44 and 46 and frames 34 and 38 form a rectangular light array directed so as to light the interior of the bay 42.

Each lighting module 98 comprises a four-foot basic Structura module 66 into which a three dimensional lighting element 100 of nearly equal length has been integrated, as shown in FIGS. 14 and 15. The fluorescent lighting element 100 has one open side and contains two conventional fluorescent light tubes 108, as partially illustrated in FIG. 15. The light array 64 is turned on and off from a single switch in an electrical distribution box 918 described in detail later. Each lighting element 100 is encased on its open side by a standard fluorescent lighting lens 124 which diffuses light emitted from the fluorescent light tubes 108 and protects against liquid splash and spray from washing and cleaning activities in the bay.

Several halogen light sources 340 are mounted on and about the service center 10, one of which is illustrated in FIG. 16. Each light source 340 is illustrated as being mounted directly to the framework or rod 68. Three light sources 340 are centrally and symmetrically located at approximately five and one-half foot intervals on the horizontal portion 86 of inverted U-shaped frame 32. Two light sources 340 are disposed on each of the longitudinal braces 44 and 46 where those braces 44 and 46 intersect inverted U-shaped frames 36 and 38. Light sources 340 are mounted on rods 68 of braces 44 and 46 and frames 36 and 38 by straps 806 affixed by a bolt or the like to a mounting box 320 and which wrap around a rod 68 as shown in FIG. 16. Each light source 340 is covered and protected by a translucent lens plate 322, shown removed in FIG. 16.

Power is delivered to each of the light sources 340 by wires encased in a conduit 390. As a general rule, the wires and conduit 390 originate from an electrical distribution box 918, as seen in FIG. 29. Electrical distribution box 918 is mounted on the rear of cabinets 920, from the top end 692, thereof and proceed thence to enter the cabinets 920 through the apertures 334. The wires and conduit 390 are also routed to the light sources 340 and other equipment described more fully hereinafter, through the interior of the triangular modules 66. Electrical power for the light array 64 is obtained in the same manner. As indicated previously, electrical distribution box 918 also serves as a control panel for light array 64 and light source 340. The light sources 340 are standard and available from a number of sources.

Equipment is mounted overhead on the lower rods 68 of basic Structura module 66 using a rectangular steel mounting plate 800 or the equivalent. As shown in FIG. 9, mounting plate 800 is a 3/16 inch thick steel plate, rectangularly formed to be approximately 6 inches wide and 12 inches long, such that the plate spans the width beneath the two lower rods 68 of a horizontal beam or brace constructed of a Structura module 66. Four apertures 804 are disposed in the corners of mounting plate 800 such that each aperture 804 is inwardly disposed and adjacent to the rods 68 of the beam or brace to which it is affixed as hereafter described. Of course, other mounting plate 800 sizes and different numbers of mounting apertures 804 may be used within the scope of this invention.

One or more mounting straps 806 comprising an inner circular attachment face the same inner diameter as external diameter of rod 68 are used to firmly affix mounting plate 800 to each rod 68. As shown in FIG. 10, mounting strap 806 is formed of plastic covered steel tape comprising a lower tongue 816. Distally from lower tongue 816, a circular attachment loop or face 818 of substantially the same diameter of rods 68 is made, forming a nearly circular cylinder When loop 818 nears tongue 816, a second upper tongue 820 is bent outward to become juxtaposed with lower tongue 816. A first mounting hole 822 is provided in lower tongue 816, and a second mounting hole 823, in upper tongue is provided, juxtaposed therewith. To releasibly attach mounting plate 800 to a beam or brace, a mounting strap 806 for each aperture 808 is placed around an appropriate rod 68 such that apertures 822 and 804 are jointly juxtaposed and lower tongue 816 contacts the upper surface of mounting plate 800. A bolt 814 is delivered through each aperture 822 and 823 in the upper tongue 820 and lower tongue 816, respectively, of mounting strap 806 and further through aperture 804 in mounting plate 800. A bolt 808 is then firmly affixed thereto. This step is repeated for each aperture 804 of mounting plate 800. In this manner, mounting plate 800 is releasibly affixed, where desired, to members 32, 34, 36, 38, and 40 and longitudinal braces 44 and 46. At least one aperture is located centrally in mounting plate 800 to receive a mounting bolt which provides the supporting link for equipment to be mounted.

A two foot diameter fan 594 is situated near each of the rear corners of bay 42. Fans 594 blow unwanted fumes from the work site, aid the vehicle drying process, help keep operating personnel cool, and cool the surface of the vehicle during hot periods. As seen in FIG. 18, each fan 594 is illustrated as being suspended by a strut 396 from a mounting plate 800 attached to longitudinal brace 44 or 46 near an intersection with inverted U-shaped frame 32, although other mountings could be used. Each strut 396 comprises a relatively long, flat piece of steel bent approximately thirty degrees about its longitudinal axis or near the midpoint 398. The top end 400 of strut 396 is bent so as to form a horizontal mounting plate or tab 400 which comprises an aperture 404 for a bolt 410. A similar aperture 810 is located centrally in mounting plate 800. Aperture 404 is juxtaposed with the aperture 810 in mounting plate 800 and a bolt 410 is threaded therethrough and affixed with a nut 408. The bottom end 412 of strut 396 also contains an aperture 414. The fan 594 contains a short strut 416 located on top of the housing 418 which contains a hermetically sealed motor 420. An aperture 422 in the fan strut 594 is aligned with aperture 414 in strut 396 so as to receive a bolt 424 secured by a nut 426. The vertical angle 428 at which the fan 594 is set is adjusted by loosening and tightening nut 426 on bolt 424.

Electric power is supplied to each fan 594 by inserting its plug 432 into one of the two standard 110 volt outlets 434 located along both of the longitudinal braces 44 and 46. These outlets 434 are supplied with power by the wires carried by conduits 390 emanating from the junction box 918. Presently preferred fans 594 are manufactured by Dayton Electronic of Chicago, Illinois. Facile on/off control for each fan 594 comprises a hermetically sealed switch 26 hanging freely but available in close proximity of fan 594 permitting each fan to be turned off and on individually.

The electrical system, of which the outlets 434 for fan 594 as described above are a part, comprises electrical wires and a power conduit 390 which carry power to each plug and therefrom to an electrical appliance from electrical distribution box 918 as seen in FIG. 29. Standard power comprising a 100 Amp 230 Volt single phase service plus ground is connected to distribution box 918 through a bottom connection 626 from a standard power source as shown in FIG. 29. The currently preferred distribution box is a Square D Company 24 position circuit breaker box, catalog number Q0C30U. Conduit 390 carries wires for dedicated 110 volt plugs comprising connections for the two fans 594, an air compressor 470, a road grime chemical applied pump 986, an engine cleaner chemical applier pump 990, a vehicle exterior blow dryer 970, a centrifugal recycling pump 756, an entry vehicle and undercarriage spray pump 712, and a water heater 720. A dedicated 230 volt supply and plug is provided for a high pressure rinse pump 710. In addition, power and on-off switches are provided in distribution box 918 for the halogen lights 340 and fluorescent lights 100. Other switches, timers, and sensors are part of the electrical system and are described where used with associated equipment.

Reference is now made to FIGS. 1, 4, 20, 21, and 27 which show the presently preferred embodiment of the cabinets in various degrees of detail. In the presently preferred embodiment, cabinets 920, comprising three separately fabricated cabinets 922, 924, and 926, are bolted together and placed as a unit in the rear of service center 10. Cabinets 920 were made to specification by A-G BODY, Inc., Salt Lake City, Utah and manufactured to a print identified as Drawing Number 1314. Cabinets 920 are fabricated from 14 gauge steel and covered with a polyurithane water impervious paint.

As seen in FIG. 1, cabinets 920 comprise eight separate compartments or sections. Cabinet 922, on the left in FIG. 1, comprises three closed compartments 860, 862, and 864. Cabinet 924, in the center, comprises a top logo or sign section 866 and a large slanted open section 868 at the bottom. On the right in FIG. 1, cabinet 926 comprises a closed top compartment 870, a middle sink bay 872, and a lower closed compartment 874. Compartments 860, 862, 864, 870, and 874 comprise identical doors, hinges, latches and locks.

Each of the right hand doors of compartments 860, 862, 864, 870 and 874 comprise a lock 952 and a central door edge 956 which overlaps the left hand door edge, when both doors are closed, thereby assuring a secure compartment when both doors are closed and lock 952 on the right hand door is locked. Each lock 952 is a Universal (Slam Bolt Locking) Paddle Lock, Part Number M5575, manufactured by Eberhard Manufacturing Co., Cleveland, Ohio. Each left hand door comprises a latch bolt (not shown) which is a Flush-Type Steel Latch Bolt with a 25 pound spring, serial number 565697, as distributed by A. G. BODY, Inc., Salt Lake City, Utah, and latches to the cabinet frame at the top of the left hand door.

As best seen in FIG. 27, each door 540 of the closed compartments comprises lips or edges 958 which overlap the perimeter 324 of each associated compartment boundaries such that the inside of each compartment is protected from liquid spray and splash when the door 540 is closed. Each door 540 is hinged to maintain the integrity of the covered boundaries of each compartment when all doors are closed.

Figure 20:
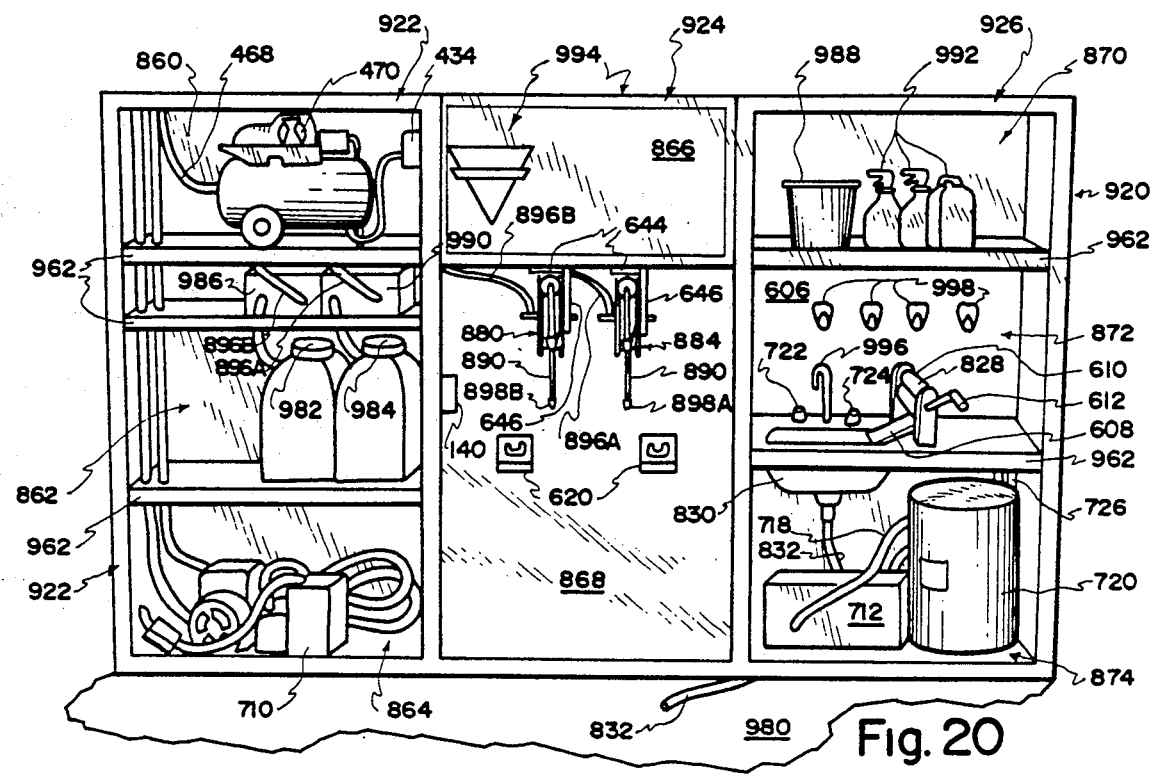
FIG. 20 is a frontal view of the cabinets with the front doors removed to show position of contents in the presently preferred embodiment.
Figure 21:
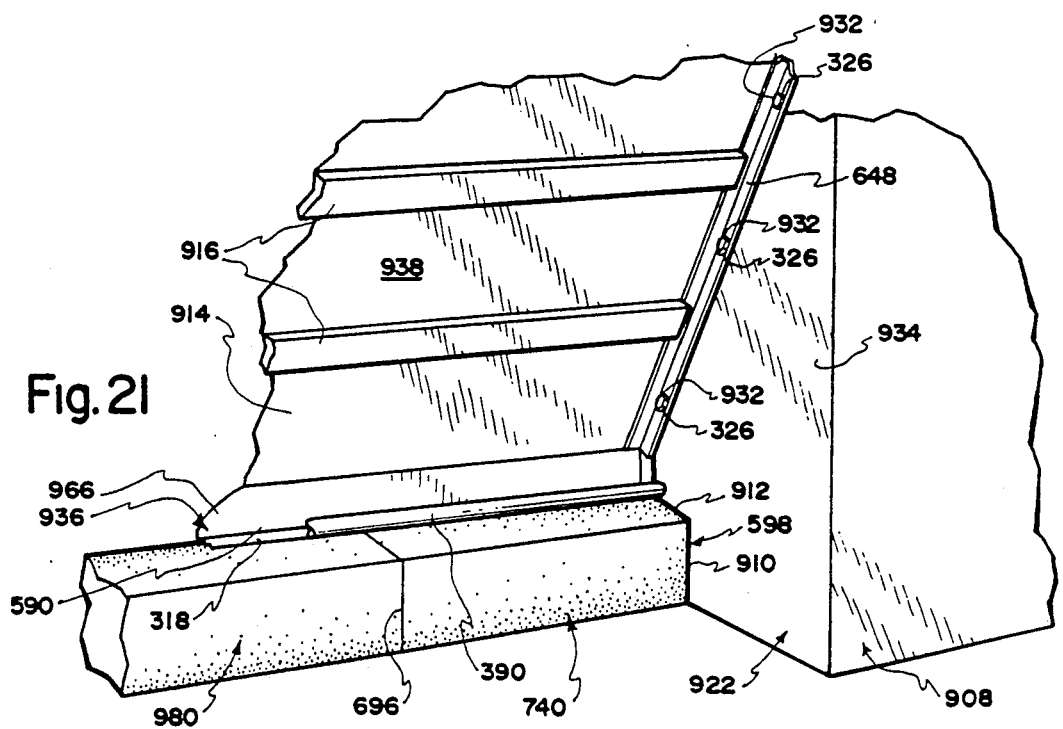
FIG. 21 is a fragmentary rear view of the cabinets of FIGS. 1 and 20 showing lower attachment of the center cabinet to a side cabinet and cabinet overhang above the flooring.
Figure 26:
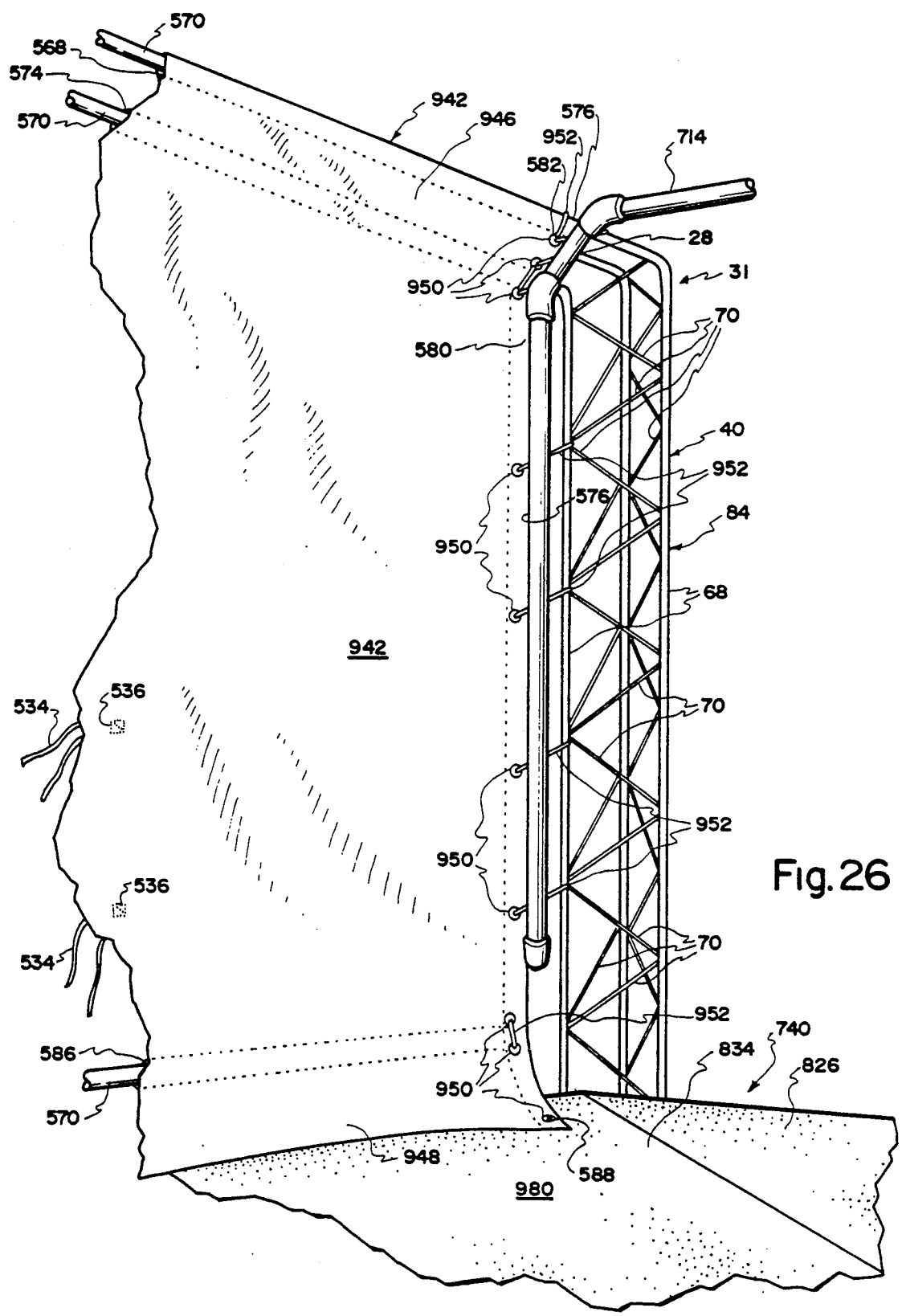
FIG. 26 is a fragmentary perspective view from inside the service center of a corner of the frame with a spray and splash containment curtain attached.

In the currently preferred embodiment, the compartments comprise a plurality of shelves 962 configured as shown in FIG. 20, but each shelf 962 is individually removable and adjustable up or down in approximately two inch increments. At least one addition shelf 962 can be added to further subdivide a compartment. As presently configured, each cabinet 922, 924, and 926 is 48 inches wide, 24 inches deep and 96 inches tall as measured from the back of the cabinet, although cabinets of different dimensions are within the scope of this invention. Each cabinet 922 and 926 rests on the ground or floor level adjacent to service center 10 flooring 740 where each cabinet opens into service center 10. Each cabinet 922, 924, and 926 comprises an inverted step 598 or overhang 912 which places a portion of each cabinet over a segment of floor 980 which is the bay 42 portion of flooring 740. As shown in FIG. 21, inverted step 598 of cabinet 922 comprises overhang 912 and abutment 910 where cabinet 922 adjoins vertically rising floor 980. Cabinet 926 comprises an identical inverted step 598 but is not shown. In the present embodiment, abutment 910 is seven inches high and overhang 912 is six inches inward from the edge of floor 980, thereby providing clearance for floor 980 while limiting the unobstructed path for sprayed and splashed fluids to exit service center 10 from under overhang 912 thereby capture essentially all spent liquid for recycling.

In the presently preferred embodiment, center cabinet 924 does not comprise a rear structure which permits it to stand alone. Instead cabinet 924 comprises, from bottom to top, a first vertical riser 936, a slanted section 938, a second vertical riser 964 (see FIG. 23), and a cabinet compartment 866. A single metal sheet is bent to form the first vertical riser 936, slanted section 938, and second vertical riser 964. The front bottom of cabinet 924 is juxtaposed with the front of each of adjacent cabinets 922 and 926. First vertical riser 936 is L-shaped wherein the bottom of the "L" provides an inwardly directed foot 318 and a top 590 of the "L" which is continuous with slanted section 938 along bend line 966, where slanted section 938 slants upward and rearward until the top of slanted section 938 lies in the rearmost plane of cabinets 922 and 926. A second bend line 968 forms the bottom of second vertical riser 964. Vertical riser 964 forms an inverted L-shape, whereby a bottom section 592 is contiguous with slanted section 938 extending vertically upward and at the top bending at a right angle proximally toward the front of cabinets 920 to form a horizontal strip 652. On each side, slanted section 938 further comprises a strip 648 bent rearward at a right angle from the front of cabinets 920. A center compartment 866 is disposed at the top of cabinet 924. In the presently preferred embodiment, compartment 866 is affixed in place by bolting each lateral side of compartment 866 to an adjacent side of cabinets 922 and 926. After compartment 866 is affixed to cabinets 922 and 926, slanted section 938 is suspended from compartment 866 by bolting horizontal strip 652 to the rear bottom 642 of compartment 866. Assembly of cabinet 924 is completed by bolting each attachment strip 648 to the centrally disposed wall 934 of each cabinet 922 and 926. As shown in FIG. 21, in this embodiment, a bolt 932 is threaded through each hole drilled in attachment strip 648 and wall 934 of adjacent cabinets 922 and 926 and affixed with a nut 326. On the rear side, slanted section 938 further comprises four lateral support braces 916 spaced at even intervals from top to bottom. Each brace 916 is U-shaped with a flange extending outward at the top of the "U" by which it is welded or otherwise permanently affixed to slanted section 938.

A self-contained portable air compressor 470 is located in cabinet upper left hand compartment 860 as shown in FIG. 20. The presently preferred model is presently a Rand 4000 available from Worldwide Ingersoll/Rand of North Carolina although other air compressors can be used within the scope of the invention. Power is supplied to air compressor 470 through standard dedicated outlets 434 (not shown) bolted or otherwise mechanically affixed to a wall of compartment 860. As described above, the outlets 434 are connected to electrical distribution box 918 by dedicated wires 434 are delivered through electrical conduit, generally designated conduit 390. A standard pneumatic hose 468 is fed outward through an aperture 334 in the top of cabinet 920, therefrom routed through the interior of the triangular top cross-section of U-shaped structural frame 32 to the interior of the triangular cross-section of longitudinal brace 46 until reaching a mounting plate 800 to which a retractable pneumatic hose unit 476 is attached.

As shown in FIG. 17, pneumatic hose 468 is attached to the retractable pneumatic hose unit 476 via a standard attachment 474. Retractable hose unit 476 is suspended from the two lower horizontal rods 68 of longitudinal brace 46 through a mounting plate 800, attached as earlier described. Hose unit 476 comprises two struts 492 and 496 welded or otherwise permanently attached to an integral rectangular mounting plate 498 which is smaller than a mounting plate 800. Integral mounting plate 498 is affixed to mounting plate 800 by a plurality of bolts 484, each inserted through an aperture 494 disposed inwardly from each corner of mounting plate 498 and therethrough mounting plate 800, firmly affixed thereto by a nut 486. The retractable hose unit 476 is known in the industry as Retracta Auto-Rewind Hose Reel and has the advantage of automatically rewinding excess hose that may otherwise be unwieldy and dangerous when left unwound. A standard air valve 478 is placed at the distal end of the Retracta Unit hose. Compressed air facilely available from air valve 478 and directable to any portion of the vehicle is used to blow water and other material from joints, cracks and other hard to reach places and to dry out engine electrical components for proper ignition as a regular part of the washing and cleaning process.

Referring again to FIG. 20, two shelves 962 are presently placed in middle compartment 862 in left cabinet 922. In the upper sub-compartment of middle compartment 862, two chemical pumps 986 and 990 are presently housed. Disposed in the lower sub-compartment of middle compartment 862 are chemical reagent tanks 982 and 984 which provide source chemicals for pumps 986 and 990, respectively.

One of the two chemical pumps, a road grime removing chemical pump 986 resides on the left of a second pump 990 as shown in FIG. 20. Pump 986 is a chemical resistant pump, Model HE 2/10EV, distributed by Hydro Engineering, Inc., Salt Lake City, Utah. Pump 986 draws prepared chemicals which are selected for road grime removal from tank or container 982 and provides a pressurized source of liquid for road grime to retractor hose assembly 880.

Though other chemicals may be used within the scope of this invention for removing road grime and other contaminants on the surface of a vehicle, the presently preferred embodiment uses Number 19 Truck Cleaner, distributed by AUTOGLYM, Salt Lake City, Utah. Number 19 Truck Cleaner is a water-based detergent designed for brushless cleaning. To use, apply Number 19 Truck Cleaner from the bottom, working application spray upwardly. Immediately after use, rinse with high pressure spray from a high pressure rinse pump 710, described in detail hereafter.

Figure 23:
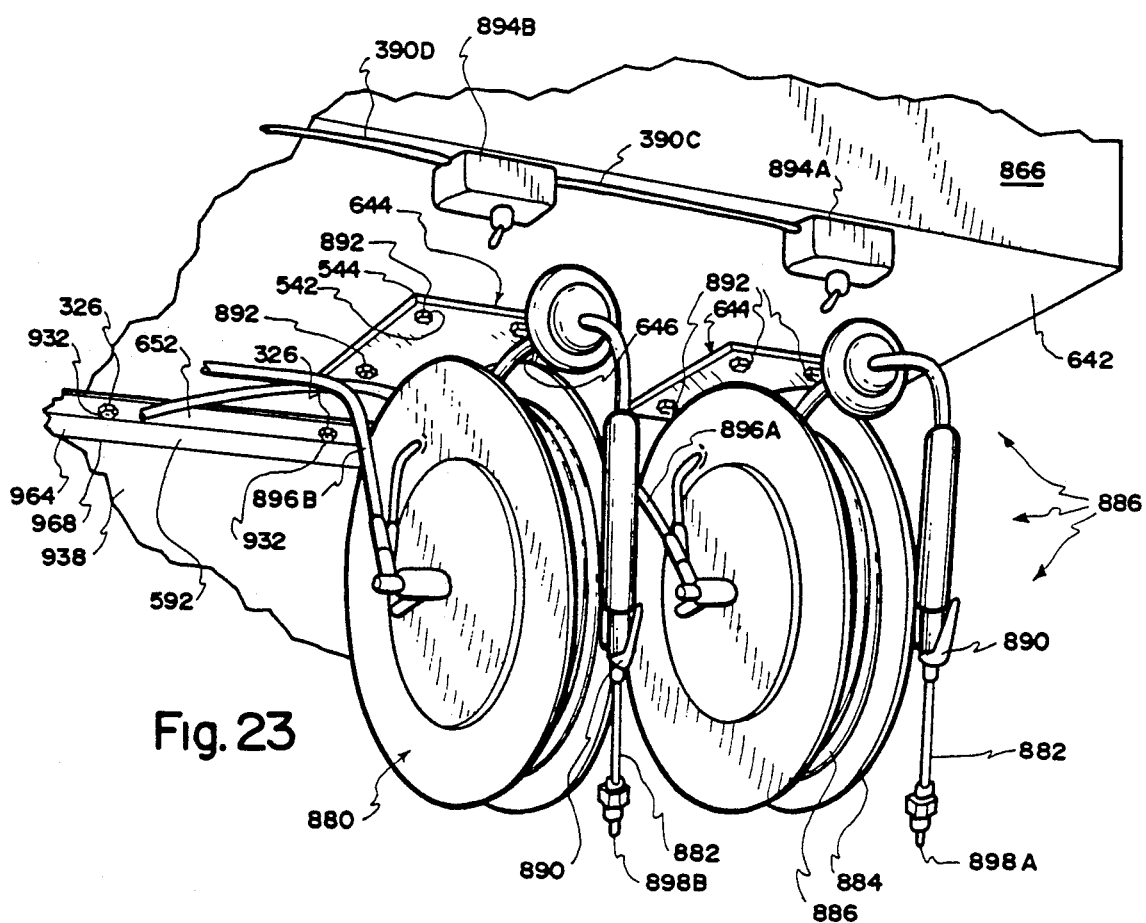
FIG. 23 is an enlarged perspective view of the road grime and engine cleaner retractable hose assemblies and control switches attached to an overhead section of the center cabinet as previously shown in FIGS. 1 and 20.

Output of pump 986 flows through high pressure chemical resistant tubing 896B, known and available in the art, and makes a standard connection to road grime hose retractor reel 880. (See FIGS. 20 and 23.) The hose retractor reel is a standard retractor reel manufactured by DURO Manufacturing, Inc., Compton, California and fitted with chemically resistant washers and seals, also known and available in the art, to withstand chemical properties of Number 19 Truck Cleaner. Reel 880 comprises a strut 646 with a right angle bend at the top to form a mounting plate 644 by which it is suspended for use. Metal plate 644 is affixed by a plurality of bolts 892, whereby each bolt 892 is inserted through an aperture 542 disposed at each corner 544 of mounting plate 644 and therethrough the bottom 642 of cabinet 866 as shown in FIG. 23. Each bolt 892 is firmly affixed a nut (not shown) inside cabinet 866. Reel 880 further comprises a retractable hose attached on the proximal end to a nozzle assembly 882. Nozzle assembly 882 further comprises a handle and a trigger 890 for facile manual control of pressurized liquids from nozzle 898B which provides a flaired, but controllable jet when the trigger is depressed.

As described earlier, power is supplied through a standard plug (not shown) disposed in close proximity to pump 986 in compartment 862. An on-off switch 894B, providing serial control switch, is affixed to the front or proximal edge of cabinet 866 bottom 642 as shown in FIG. 23 and is connected to pump 986 by wires through conduit 390D. To apply Number 19 Truck Cleaner to a vehicle, switch 894B is turned on and hose and nozzle assembly 882 is extended to the site to be cleaned. Trigger 890 is depressed and the site to be cleaned is thoroughly wetted as earlier described. Immediately after spray washing, the site is thoroughly rinsed.

The second of the two chemical pumps, an engine cleaner chemical pump 990 is located to the right of pump 990 in the upper subcompartment of compartment 866 as shown in FIG. 20. Pump 990 is a chemical resistant pump, Model HE 2/10EV, distributed by Hydro Engineering, Inc., Salt Lake City, Utah. Pump 990 draws preprepared chemicals which are selected for engine cleaning from tank or container 984 and provides a pressurized source of liquid for engine cleaner hose and nozzle assembly 886.

Even though other chemicals may be used within the scope of this invention for cleaning an engine of a vehicle, the presently preferred embodiment uses Number 6 Engine Cleaner, a solvent based neutral, water soluble detergent distributed by AUTOGLYM, Salt Lake City, Utah. Number 6 Engine Cleaner is designed for removing grease and oil from engine areas and door shuts. Surfaces must be dry for Number 6 cleaner to work most effectively. To use, No. 6 Engine Cleaner is applied by spraying and let "work" for two to five minutes. No. 6 Cleaner and engine contaminants are then removed by spraying with the high pressure rinse spray, described in detail hereafter. Rinsing is performed bottom to top. As an alternative to Number 6 Engine Cleaner, Number 38 Clean-all Industrial Cleaner, an alkaline detergent distributed by AUTOGLYM, Salt Lake City, Utah, may be used in a manner substantially similar to that of Number 6 Engine Cleaner.

Output of pump 990 flows through high pressure chemical resistant tubing 896A, known and available in the art, and makes a standard connection to engine cleaner hose retractor reel 884, of the same type as reel 880. Retractor reel 884 is also fitted with chemically resistant washers and seals, identical to those used in retractor reel 880, to withstand chemical properties of Number 6 Engine Cleaner. Reel 884 also comprises a strut 646 with a right angle bend at the top to form a mounting plate 644 by which it is suspended for use in a manner similar to that described for reel 880. Reel 884 further comprises a retractable hose attached on the pruoximal end to a hose and nozzle assembly 886. Hose and nozzle assembly 886 further comprises a handle and a trigger 890 for facile manual control of pressurized liquids from nozzle 896A which provides a flaired, but controllable jet when the trigger is depressed.

As described earlier, power is supplied through a standard plug 434 (not shown) disposed in close proximity to pump 990 in compartment 862. An on-off switch 894A, shown in FIG. 23, providing a serial control switch, is firmly affixed by being bolted or the like to the front or proximal edge of cabinet 866 bottom 642. To apply Number 6 or Number 38 Engine Cleaner to the engine of a vehicle, switch 894A is turned on and hose and nozzle assembly 886 is extended to the site to be cleaned. Trigger 890 is depressed and the engine is thoroughly wetted. After allowing the chemicals to "work", the site is thoroughly rinsed with a high pressure spray from the bottom up.

High pressure rinse pump 710 is disposed in the lowest compartment 864 in left cabinet 922. Influent water is manually selected by an electrically activated valve 730, shown schematically in FIG. 24, which selects either recycled water previously used in service center 10 or pristine filtered water for final rinse derived from a water utility or bulk supply reservoir and filtered before use as hereinafter described. Conditional operation of valve 730 is also described in detail later.

In the presently preferred embodiment, pump 710 is turned on and off by an automatic shutoff switch 24 also located in compartment 864 (shown schematically in FIG. 24) which presets to three minutes each time pump 710 is on and rinse fluid is not being used. At the end of a predetermined continuous period of non-use of rinse fluid, pump 710 is automatically turned off, thereby extending the useful life of pump 710. Three switches 140 which activate the automatic shutoff switch 24 are conveniently located about service center 42. As shown in Figure 2, a first switch 140 is located at the right hand side of the entrance to bay 10. As best seen in FIG. 3, switch 140 comprises a standard two position switch box 16 and ON-OFF buttons 146 clearly marked and colored (green for ON and red for OFF). Switch box 16 is firmly affixed to a rod 68 or front column 84 of U-shaped frame member 40 by a metal cinching band 142. A conduit 390B which carries wires to the automatic shutoff switch 24 exits switch box 16 from the top and is threaded upward through the triangular interior cross-section of frame member 40, therefrom along a similar path in lateral brace 46 and therefrom to cabinet 864 where the automatic shutoff switch 24 is disposed. Where required for weight support, conduit 390B is further constrained from movement by connection to a W-shaped stringer 70 by a plastic electrical cable tie 144 as seen in FIG. 3. Cable ties 144 are thus placed where necessary to adjust the protect conduit 390B from wear and inappropriate movement. A second switch 140 is located in a similar position on the left hand side of the entrance to bay 42. A third switch 140 is located on the upper left hand side of compartment 868 as shown in FIG. 20. Switches in these three positions provide facile electrical access to reset the automatic shutoff switch 24.

Pump 710 is a 220 volt, single phase pump, model 4/1000E distributed by Hydro Engineering, Inc., Salt Lake City, Utah capable of delivering in excess of 150 pounds of pressure through a one-half inch line. Influent water is delivered from one of two sources as determined by the setting of valve 730 (see FIG. 24). Influent water is delivered by a low pressure tube or hose through apertures 334 in the top of cabinet 922 and shelves 962. Effluent liquid is delivered through high pressure hose (known and available in the art) which travels upward through apertures 334 in the shelves and top of cabinet 922 and therefrom to the triangular interior cross-section of the top of U-shaped frame 32 to a similar interior cross-section of longitudinal brace 44 to retractable high pressure hose assembly 900.

Figure 24:
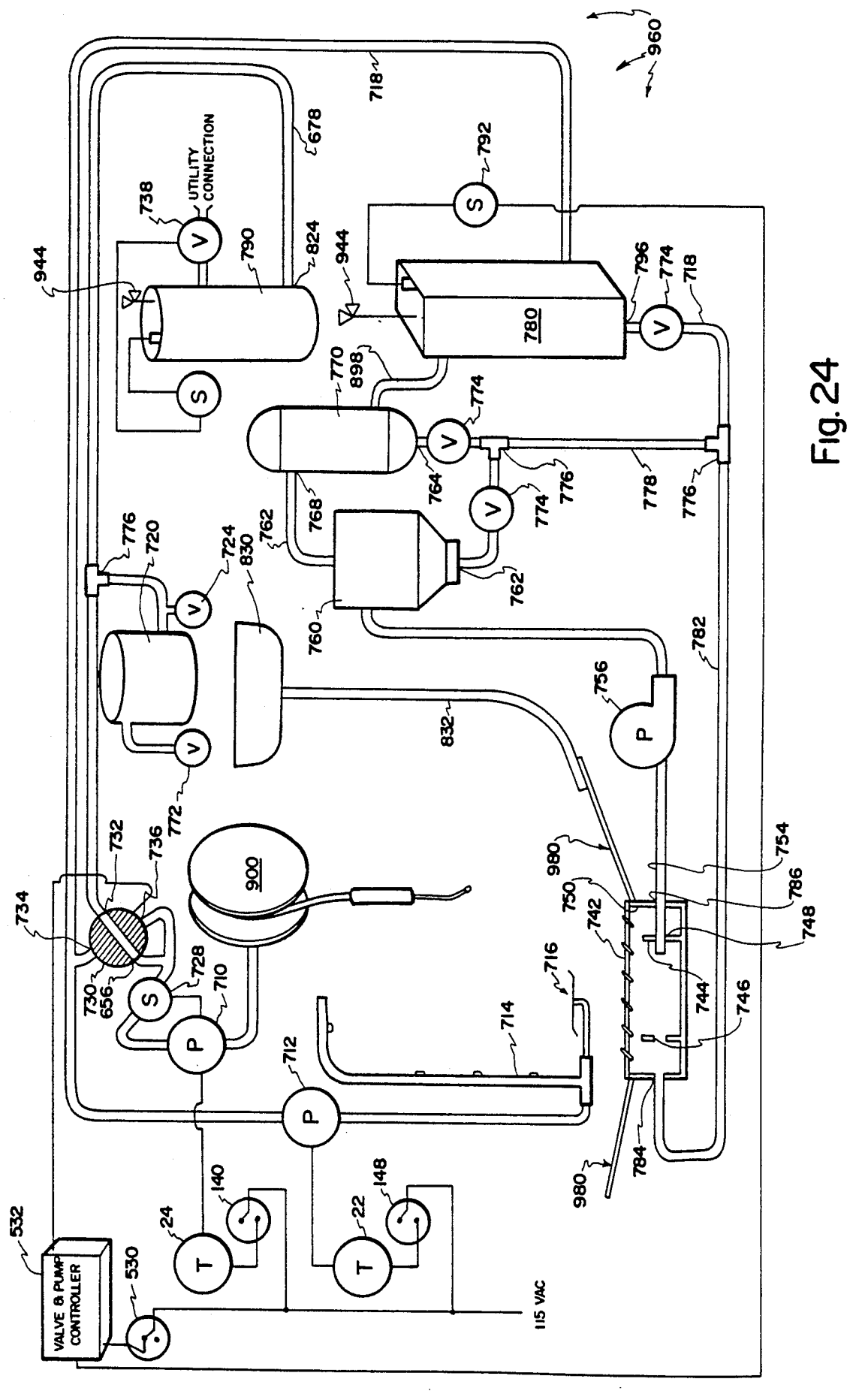

Retractable high pressure hose assembly 900 is shown in FIGS. 1 and 24, but best seen in FIG. 19. Retractable hose reel 476 comprises a strut 906 which is welded or otherwise permanently affixed to an integral mounting plate 534. Mounting plate 534 comprises plate dimensions and an aperture 808 at each corner by which integral mounting plate 534 is attached to longitudinal brace 44, in the exact manner described above for attachment of a mounting plate 800, thereby suspending reel 476 for use in bay 42. Reel 476 is a retractable high pressure hose assembly, part number 47313, available from Hydro Engineering, Inc., Salt Lake City, Utah, and comprises a 50 foot long high pressure water hose 902 and wash wand 904. Wash wand 904 is a variable pressure wand known and available in the art which comprises a three position trigger and dual nozzle such that a first position of the trigger is off, a second position delivers fluid to both nozzles (thereby a lower velocity flow), and a third position which delivers fluid to just one nozzle (and thereby a higher velocity flow). Other wash wands are usable within the scope of the invention.

Compartment 866 in center cabinet 924 comprises a front and back, (two sided) back lighted, two by four foot sign 994 and does not open for storage. As described earlier two hose assemblies 880 and 884 attach by welded plates to the underside 642 of compartment 866. Also two switches 894A-B which control pumps 990 and 986, respectively, which provide pressurized chemicals to hose assemblies 880 and 884 are suspended from the bottom 642 of compartment 866 as described above.

Figure 22:
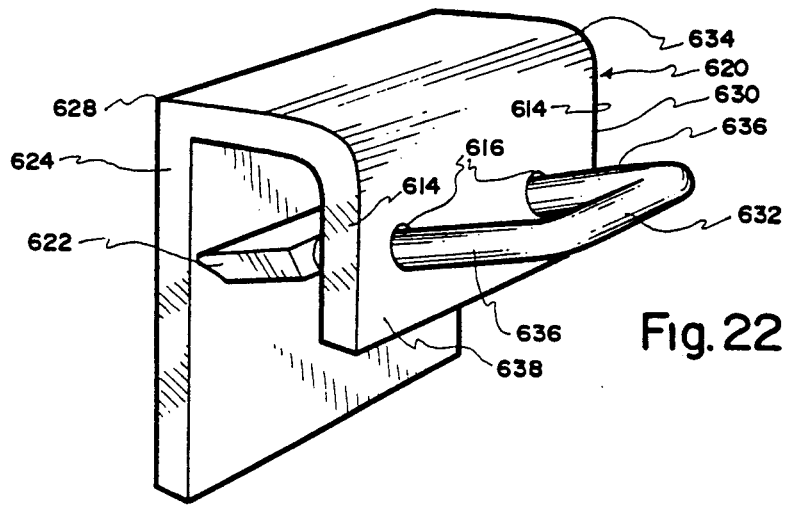
FIG. 22 is an enlarged perspective of representation of one of the vehicle floor mat hangers located in the center cabinet as shown in FIG. 20.

Compartment 868, as described above, comprises a slanting face and a place for timer switch box 16. As shown in FIG. 20, two identical vehicle floormat hangers 620 are bolted, welded or otherwise permanently affixed to the sloping face of compartment 868. Each floormat hanger 620, best seen in FIG. 22, comprises a wall attachment plate 624 which is acutely bent along line 628 and thereafter arcuately curved along a second line 634 to from a faceplate 630 which is parallel to wall attachment plate 624. Two apertures 616 are disposed equidistant from outside edges 614 approximately midway between the a longitudinal center line and outside edges 614. Two stems 636 of a handle 632 are inserted therethrough and affixed to a catchplate 622. To use, a floormat is fully inserted past catchplate 622 which is drawn inward by friction of the floormat and the force of gravity to hold the floormat until released by pulling on handle 632 or repeatably, forcibly pulling the floormat downward until catchplate 622 no longer contacts the floormat.

Compartment 870 in right cabinet 924 presently comprises temporary storage for buckets 988, bottles of chemicals 982, and the like. In the presently preferred embodiment, chemicals which are stored in compartment 870 comprise Number 7 Rust and Alloy Cleaner, Number 14A Car Shampoo, and Number 14B Bodywork Shampoo Conditioner, all available from AUTOGLYM, Salt Lake City, Utah. Other manual cleaning chemicals can be used within the scope of the invention.

Number 7 Rust and Alloy Cleaner is an acid-based acidic detergent designed to rapidly dissolve brake dust, corrosion and traffic film from metal and non-metallic wheel surfaces. Number 7 Rust and Alloy Cleaner is not classified as corrosive because it is less than 20% acid by weight (It is therefore classified as an irritant).

Number 14A is a neutral water-based detergent. Number 14A Car Shampoo lifts traffic film without harm to polished paintwork and trim. Number 14B Bodywork Shampoo Conditioner is similar to Number 14A Car Shampoo with silicone enhancers included and is for use on cars previously coated with a plastic conditioner.

Compartment 872 comprises a sink 830 with a drain hose 832, a chamois wringer 828, and chamois drying hooks 998. Sink 830 further comprises a spout 996 from which a mix of hot and cold water, controlled by hot water tap 722 and cold water tap 724, flows. As shown in FIG. 24, cold water tap 724 comprises a direct connection to a rinse tank 790 and hot water tap 722 comprises a direct connection to a water tank 720. A chamois wringer 828 is a standard manual wringer comprising a handle 612, wringing roller mechanism 610, and an inclined water drain 608. Chamois' partially dry from wringing are hung on at least one hook 998 permanently affixed to the front of compartment back panel 606. Drain hose 832 exits sink 830 and follows a path through an aperture in the bottom of compartment 874 (not shown) and travels thereunder to reappear on floor 980 at the front of cabinets 920 as shown in FIG. 20. Thus, all waste liquid flowing from sink 830 is dispensed onto floor 980 where it flows or is washed to a sump 750, to be described in detail hereafter, for recycling.

A blow dryer 970 provides a vehicle exterior drying alternative or addition to the use of a chamois. As shown in FIG. 28, service center 10 further comprises a blow dryer 970 set behind and exterior to service center 10 spray and splash curtain 942. The presently preferred blow dryer embodiment comprises a FUTURA BLO DRYER, manufactured by Specialty Equipment Company, Mendota Heights, Minnesota. A flexible hose 972 emanates from the top of an outlet box 578 and is draped across longitudinal brace 44 for an inwardly disposed side entry into bay 10. A stand 976 is affixed to floor 980 by screws or the like to provide out-of-the-way containment for hose 972 and dryer nozzle 974 when not in use. Further a hermetically sealed on-off switch 978 is disposed in the vicinity of hose 972 for easy access before and after blow drying.

Compartment 874 comprises a water heater 720 and pump 712 as shown in FIG. 20. Water heater 720 provides hot water for water tap 722 and is otherwise more fully described hereafter.

Pump 712 is a 110 volt high pressure pump, manufactured by TEEL Industries and distributed by W. W. Granger, catalog part number 2P280 (catalog number 377). The influent tube 718, as shown in FIG. 24, is directly from outlet 794 of a used or recirculated water tank 780. The influent connection is made by tube 718 received from above cabinet 924 and threaded downward through apertures 334 in the top and shelves of cabinet 924 to pump 712. Effluent tubes follow the same path out of cabinet 924 and therefrom through triangular interior cross-sections of the frame as herebefore described to the front of bay 42 to connect directly with spray arch 714 as seen in FIGS. 1, 2, 24, and 26.

As best seen in FIG. 1, spray arch 714 comprises an upside down U-shape at the vehicle entry port of service center 10. As seen in FIG. 2, spray arch 714 further comprises a plurality of inwardly disposed nozzles 654 which, when spraying, completely wet a car as it is slowly driven into bay 42. In addition, a circular undercarriage spray 716 (shown schematically in FIG. 24) is turned on in concert with spray arch 714 as both are fluidically connected in parallel. One switch 148 (as seen in FIG. 3) is located on each side of the vehicle entry port of service center 10. Each switch 148 is connected in parallel to a spray timer 22 (shown schematically in FIG. 24), also located in compartment 874, presently set for 30 seconds to allow time to drive a vehicle completely through the spray upon entry. The spray timer 22 is a resettable timer similar to rinse timer 24 describe above, but set for a shorter period of time. In use, switch 148 is depressed and then vehicle is slowly driven through the exterior sprays while entering the service bay. After 30 seconds (the period established for the sprays to stay on) the spray timer 22 turns off, discontinuing operation of pump 712. Note that, in this embodiment, recycled water is used. Use of recycled water assures greater evaporation of used water and opens the way for greater use of first used water in the final rinse process, as will be explained later.

Service center 10 reclaims and recycles water and other solutions for reuse, whereby only a small amount of water is lost while washing and cleaning a vehicle in service center 10 as compared to about one hundred gallons lost in similar circumstances in a standard manual car wash and to one hundred and twenty gallons lost in a similar home based car washing procedure. For reclaiming and recycling water and other solutions, service center 10 comprises a spray and splash containment apparatus 940, a light weight water collecting platform or flooring 740, and a liquid reclaiming and recycling system 960.

Spray and splash containment apparatus comprises a tarpaulin or curtain 942 disposed along the sides of service center 10 cabinets 920 when bay 10 is configured as a unit whereby vehicles ingress and egress from the same portal as seen in FIG. 1. When center 10 is configured vehicle ingress and egress at both ends, cabinets 920, are disposed along the sides of service center 10 between vertical columns 84 taking the place of curtains thereat. As partially seen in FIG. 26, each curtain 942 is a single rectangular sheet of rubberized canvas or other water repellant and chemical resistant material and is used to contain liquid spray and splash from emanating from the sides of bay 42. Each curtain 942 is large enough to extend at least the full inner length and height of one side of open frame work 31 and comprises three channels or pockets for support rods 570. The uppermost pocket 568 is formed by a hem, open at both ends to slidably and facilely receive a support rod 570 which comprises one-half inch aluminum tubing with a 1/16 inch wall thickness and is at least the length of curtain 942. A second pocket 574 is disposed parallel to but approximately six inches below the upper pocket 568, is also the length of curtain 942, and is made by sewing a one and one-half inch wide strip of the same material from which curtain 942 is made to the same side of the curtain to which the hem is sewn. This creates an inwardly direct concave configuration to the curtain which intercepts sprayed water which would otherwise escape the containment. A third pocket 586 is also parallel to the other two pockets 568 and 574 and of similar length and width as pocket 574, but disposed to reside about two inches above floor 980 when curtain 942 is hung. A support rod 570 is fully inserted into each pocket 568, 574, and 586 before curtain 942 is attached to open frame 31.

Along each vertical side of curtain 942, a second one and one-half inch hem is sewn to support a plurality of eyelets 950 by which curtain 942 is rigidly anchored to U-frame structures 32 and 40. The top eyelet 582 is disposed such that the upper edge of eyelet 582 is tangent to the sew line, below the hem of pocket 68. An eyelet 950 is placed on the outside and contiguous with each sew line of second pocket 574. Similarly, one eyelet 950 is placed outside and contiguous with each sew line of third pocket 86. Between the eyelets 950 disposed centrally to pockets 574 and 586, four additional eyelets are attached at approximately equal intervals. Another eyelet 588 is disposed in the bottom corner of each curtain 942. At each intersection between a column 84, of frame members 34, 36, and 38, and curtain 942, a series of three eyelets disposed about pockets 568 and 574 as previously described for eyelets along the vertical edge of curtain 942, are affixed. Disposed at a sew point 536 at equal intervals directly below eyelets juxtaposed with frame members 34, 36, and 38, four nylon tie strings 534 are sewn on the frame side of curtain 942. Each nylon string 534 comprises a length of approximately eighteen inches.

Curtain 942 is suspended and anchored to open frame 32, 34, 36, 38, and 42 at each eyelet with flexible a plastic tie 952 comprising electrical cable ties or other suitable tie material. To hang curtain 942 on open frame 31, the two pockets 568 and 574 are inset into inner transitionary member 28 and a tie 952 is inserted through each top eyelet 582 and tied to adjacent W-shaped stringers 70 and rods 68. Similarly a tie 952 is threaded through the two eyelets 950, disposed about pocket 574, and anchored to the stringers 70 and rods 68 at the bottom of inner transitionary member 28, drawing the lower portion of curtain 942 closer to column 84 and creating an overhang at the top of curtain 942 which is in the plane of each inner transitionary member 28. A similar anchoring tie 952 is inserted through the two eyelets 950 about lower pocket 586. At the intermediate eyelets 950, between the pockets 586 and 574, a single tie 952 per 950 eyelet is threaded therethrough and tightly cinched to W-shaped stringers 70 and rods 68. Further anchoring and rigid attachment is provided by tieing the nylon tie strings 534 to neighboring stringers 70 and rods 68.

At the rear of bay 42, where the distal edge of each curtain 942 is juxtaposed with a proximal outside corner of either cabinet 922 or 926, all eyelets, except those which tie to inner transitionary member 28, are bolted to the front outer edge or each associated cabinet 922 or 926. As shown in FIG. 31, bolting is accomplished using a bolt 316 and washer 314, whereby the washer comprises an outer dimension greater than the inner diameter of an eyelet 950 and inner diameter less than the head diameter of the bolt 316. Bolt 316 is inserted through washer 314 and eyelet 950 and therefrom through a juxtaposed aperture drilled in cabinet 922 or 926. An anchoring nut (not shown) is thereafter affixed. By this attachment of a curtain 942 on each side of bay 10 to a neighboring side of cabinets 920, a contiguous water containing surface is maintained along the sides and back of bay 42. At the top, curtain 942 comprises an overhang 946 and, at the bottom, curtain 942 comprises an inwardly disposed bottom segment 948 which further act to contain spray and splash which would otherwise emanate from bay 42.

Referring to FIGS. 1, 11 through 13, 24, and 25 flooring 740 comprises five sections for a single ingress/egress port service center 10 or six sections for a drive through service center. Two identical sections 854 and 858 and two other like, but of opposite hand, sections 852 and 856 form the floor 980 of bay 42. Flooring 740 further comprises at least a first ramp 826. If service center 10 is a drive through with ingress and egress portals at both ends, a second ramp 826 is placed at the end opposite first ramp 826 in bay 42. The floor 980 is approximately twelve feet wide by twenty-three feet long, such that floor 980 fits snugly between vertical columns 84 and extends approximately six inches longitudinally beyond the outermost edge of U-shaped structural frames 32 and 40 when disposed symmetrically inside bay 42. Since the four sections which form floor 980 are of like construction, a description of only section 858 is provided. As seen in FIG. 11, section 858 comprises parallel longitudinal members 836, 838, 840, 842, and 844 which extend at right angles distally from proximal edge crossmember 848. Longitudinal members 836, 838, 840 and 842 extend from and are affixed to distal edge crossmember 846. Distal crossmember 846 is parallel to but approximately seven inches shorter than proximal crossmember 848. Attached at the central end 878 of distal edge crossmember 846, a short longitudinal edge member 890', which is parallel to longitudinal member 842, distends proximally two and one-half feet where a short edge crossmember 876 is attached at a right angle on one end to longitudinal edge member 890' and also at a right angle on the other end to longitudinal edge member 844 which is affixed on its other end to proximal edge crossmember 848, thus completing the periphery of section 858. From above, section 858 appears as a rectangle with a smaller rectangular bite taken out of the central distal corner. As shown in FIG. 11, longitudinal member 838 is disposed to the right of longitudinal edge member 836 or inward such that the outer edge longitudinal member 836 is approximately 21 inches from the nearest edge of longitudinal member 838. Longitudinal member 840 is disposed further inward from longitudinal member 838 such that facing edges of members 638 and 840 are typically ten and one-half inches apart. Longitudinal member 842 is similarly disposed further inward from longitudinal member 840 such that facing edges of members 840 and 842 are also typically ten and one-half inches apart.

Twelve support cross braces 850 A-L are disposed at right angles between the longitudinal members 836, 838, 840, 842, 844, 846, and 890' dividing the spaces between adjacent cross braces and the spaces between each cross brace and associated edge cross member into equal longitudinal distances. The braces are formed of standard two by four inch wooden studs affixed to the longitudinal members at ground or floor level. The longitudinal members are formed from standard two by six inch wooden studs trimmed as shown in FIGS. 11, 12 and 13 to define a plane which slopes distally and centrally, in the orientation of floor 980 in FIG. 11, such that water disposed on that plane is urged to flow centrally and distally by the force of gravity. At the outer edges, floor 980 height is the height of the widest dimension of a two by six. At the inner most edges, the height is reduced to approximately four and one-half inches. A three-fourths inch sheet of plywood is cut to match the pattern formed by the outer edges of the edge members and affixed thereto with nails or the like. To assemble a floor 980, sections 852, 854, 856 and 858 are disposed as shown in FIG. 11 such that the rectangular bite of each section is juxtaposed with adjacent similar rectangular bites to form a rectangular hole for a sump 750. Around the periphery of the sump 750 a groove 18 is cut in the plywood forming a top surface 834 as shown in FIG. 25. Groove 18 dimensions comprise a depth of three-eighths of an inch and a width of one and one-eighth inches. Groove 18 comprises a frame which supports a grating 742 which covers sump 750. (See FIG. 11.) When assembled, abutting short edges of each adjacent section 852/854 and 856/858 form abutting short edges 94. Similarly, abutting long edges of each adjacent section 852/858 and 854/856 form abutting long edges 696.

Ramp 826 is symmetrical about a line extension of edge 696. As shown in FIG. 11, ramp 826 comprises ramp longitudinal members 682, 684, 686, and 688. Each ramp longitudinal member 682, 684, 686, and 688 is formed from a two by six wooden stud which is transversely cut to form a right angle triangle having a base of three feet and a height of the larger width dimension of a two by six. Each ramp longitudinal member extends proximally from an edge cross member 680, the length of which is the width of floor 980, in alignment with corresponding longitudinal members in an adjacent floor section. For example when ramp 826 is in place, edge ramp longitudinal member 682 is aligned with longitudinal member 836 of section 856. Similarly, longitudinal members 684, 686, and 688 are aligned with longitudinal members 838, 840, and 842, respectively, of section 856. Cross braces 664, 666, and 668 are wooden two by four inch studs which are placed in line and at right angles to the longitudinal ramp members at ground or floor level and at the closest distance from the proximal edge of the ramp where the cross braces do not present an edge above the top of the triangular plane formed by the top surfaces of the longitudinal members. Mirror image construction of the ramp comprises four other like longitudinal members and three additional braces on the right hand side. One additional brace 670, aligned with the other cross braces, provides support between the central ramp longitudinal members. Similar to Floor 980, three-fourths inch thick exterior plywood sheeting is cut to provide a top cover for ramp 826.

Before assembly, the ground or floor surface upon which flooring 740 is to rest is leveled. If the floor is not level, as is commonly the case in a parking garage, grouting is placed below the contact surface of each longitudinal member and formed to provide a level surface or platform. When assembled with floor 980 to form flooring 740, the outer edge of ramp edge cross member 680 is juxtaposed against the proximal edges of sections 852 and 858. If a second ramp 826 is used on the opposite end of a service center 10 to form a drive through tunnel, the second ramp 826 is similarly juxtaposed against the distal edges of sections 854 and 856. When finally assembled, each adjacent inner edge of each section and each ramp is set into a position constraining U-clamp 674, as shown in FIG. 30 wherein 674A and 674B represent adjacent cross members and longitudinal support members. Thus, in a five piece flooring 740, six U-clamps 674 are used joining sections 858/852 and 854/856 along abutting long edges, joining sections 858/856 and 852/854 along abutting short edges, and further joining ramp 826 distal edge cross member 680 to each proximal cross members of 858 and 852. In a six piece flooring, eight clamps are used. Once the sections 852, 854, 856, 858 and ramp 826 of flooring 740 are in place, all abutting edges are caulked to make leakproof joints.

The platform and ramp comprise adequate reinforcement under load-bearing areas, which transfer forces directly into the concrete or other floor structure, such that, when properly installed, the platform supports a 4,500 pound vehicle load on the load-bearing areas. Proper installation comprises setting structure on a flat surface, grouting unlevel areas so that the platform or flooring 740 is not bridging unlevel areas. This load-bearing area is designed to accommodate from a three foot ten inch vehicle tire track to an eight foot vehicle tire track as measured laterally centered in bay 10. In use, care is taken to insure vehicles are centered on the flooring 740.

The entire platform or flooring 740 is covered with fiberglass materials comprising Dion general purpose polyester resin, Certainteed 2 oz. chop strand mat, Certainteed 24 oz. woven roving, and Glidden gel coat, although other coverings which provide a waterproof seal can be used within the scope of the invention.

The following basic steps are used to fabricate the illustrated flooring:

1. A wooden framework is constructed using wooden two by four in studs and two by six inch studs. The loadbearing by six inch studs are cut on a taper to provide a contact plane along the top surfaces of the studs.
2. A three-fourth inch layer of exterior grade plywood is installed over the structure to tie support members together, and as backing for fiberglass.
3. On the underside of platform or flooring 740, seams between the plywood, longitudinal support members, and cross braces are bonded with a fiberglass structural bond comprising two layers of 2 oz. chop strand mat and one layer of 24 oz. woven roving. Bond thickness is approximately three-sixteenths inch. The complete underside is sealed with resin.
4. The top surface 834 is then encapsulated in fiberglass. Laminate thickness is one-fourth inch. Laminate sequence comprises alternating layers of chop strand and 24 oz. woven roving.
5. Finally, a non-slip surface and a gel coat which is known and available in the art is applied.

Other suitable free-standing drainage/floor constructions may be used without departing from the scope of the present invention. A self-contained, stand-alone fluid recovery and recycling system 960 is seen schematically in FIG. 24 wherein at least one of the floor 980 sections comprises a pathway for an effluent tube or pipe 754 which communicates between a baffle 744 centrally located in sump 750 and a pump 756 located adjacent floor 980, outside splash or spray curtain 942. Better seen in FIG. 25 is effluent tube 754 directly connected to baffle 744 and a second influent tube or pipe 782 in a pathway in a second floor 980 section which connects directly to a sump 750. In the presently preferred embodiment, floor 980 section 854 comprises effluent tube 754, and section 852 comprises influent tube 782. Sump 750 comprises an open sealed box, preferrably of synthetic resinous material, which receives material flow in the form of aqueous solutions and influent particulates produced as waste from washing and cleaning. Baffle 744 lies centrally in sump 750 and comprises six holes 746 disposed on one end near the top of baffle 746, such that the majority volume of sludge and solid materials contained in the effluent settle toward the bottom of sump 750 and do not flow out of sump 750, through baffle 744, and outward through effluent tube 754. Sump 750 thereby forms a settling catch basin where solid waste is periodically removed from service center 10. The height of both sump 750 and baffle 744 are restricted such that, in normal operation, grating 742 covers sump 750 and baffle 744 and hides them from view.

Referring once more to FIG. 24, in addition to the flooring 740 and curtain 942, the fluid recovery and recycling system 930 of service center 10 comprises three pumps 710, 712, and 756, a desander 760, a filter 770, a used or recirculation water tank 780, a rinse water tank 790, a water heater 720, a hot water tap 722, a cold water tap 724, sink 830, and a number of valves and sensors to be discussed in detail in the following material. Unless otherwise specified, all tubing comprises PVC one and one-half inch tubing. Also, unless otherwise specified, all electrically controlled valves are ASCO 110 volt solonoid valves. Liquids recovered from effluent tube 754, which exits the baffle at aperture 748 and the sump at aperture 786, is pumped by centrifugal pump 756 into desander 760. Apertures 748 and 786 are caulked or otherwise sealed to provide a sealed pathway for effluent tube 754 to pump 756. Though other pumps may be used instead, within the scope of the invention, presently preferred pump 756 is a Straight Centrifuge Chemical Resisting Pump, manufactured by Teel Industries, and distributed by W. W. Granger Company, catalog number 1P947. Desander 760 is a centrifugal desander which is known and available in the art. Desanded outflow from desander 760 flows through tube 762 to influent port 768 into filter 770. Presently preferred filter 770 is a ten micron disposable cartridge filter manufactured by Pall Profile Filters, East Hills, New York. Aqueous effluent from filter 770 flows through tube 898 to recirculation tank 780 to be stored for further use. Recirculation tank 780 comprises a rectangular PVC tank. Desander 760, filter 770, and recirculation tank 780 each comprise a drain through a manually controlled valve 774 such that sediment accumulating in the bottom of each vessel can be periodically purged to sump 750. In operation, sediment is released through drain 796 in recirculation tank 780 by manually actuating a valve 774 which releases flow through tube 718. Similarly, sediment is released from filter tank 770 through drain 764 by actuating a valve 774 and from desander 760 through drain 762 by actuating another valve 774 to release effluent flow to a tee 776 to a common effluent tube 778. The effluent drain flow is commonly joined at a tee 776 to flow through tube 782 and enter sump 750 through input port 784 where the sediment settles to the bottom and is manually removed with all other solid waste from service center 10. Liquid thus returned to sump 750 flows into baffle 744 through apertures 746 to be returned by centrifugal pump 756 to desander 760 onward to be recycled.

During each wash, only a few gallons of liquid (mostly water) is lost to evaporation depending on climatic conditions. This loss compares to approximately one hundred gallons in a typical manual car wash and an excess of one hundred and twenty gallons in a home wash procedure where used water is not recycled and lost to a sewer or to the ground where it is absorbed or finally evaporated. In the presently preferred embodiment, water from a utility is directly connected to a rinse tank 790 through a valve 738 and intermittently filled under control of sensor 798 to replenish water supply in fluid recovery and recycling system 960. Rinse tank 790 comprises an eighty gallon cylindrical tank approximately eighteen inches in diameter and six feet tall. Rinse tank 790 is made from PVC and comprises a one foot high column of replaceable filter grade carbon for removing influent impurities. The influent water source is connected upstream through valve 738. Sensor 798 is a bi-level liquid level sensor, comprising a hysteresis of about ten gallons, sensing a fill start level and maximum fill level such that when rinse tank is drained to a point ten gallons below maximum fill, valve 738 is opened to draw water from the influent source. When rinse tank 790 is filled to maximum, sensor 798 closes valve 738. Within the scope of this invention, the influent water source may be derived from a direct connection to a water utility or from a large supply tank which is filled as required. Also, if the source water requires, a water deionizer, known and available in the art, can be placed between the water source and rinse tank 790.

Both rinse tank 790 and recirculation tank 780 comprise relief valves 944 which allow air intake when each tank is draining and exhaust air when a tank is filling and limit pressure buildup inside the tank to maintain tank safety limits under all circumstances. Rinse tank 790 and recirculation tank 780 are placed upon elevating stands which are safely and securely affixed to vertical columns 84 thus providing hydrostatic pressure to fill downstream lines and tanks and providing priming pressure for downstream pumps. Recirculation tank 780 is removable or drainable for periodic cleaning to remove the entire contents when the liquids therein become too contaminated for further use.

Effluent rinse water from rinse tank 790 flows outward from effluent port 824 through tube 678 to connections comprising a tee 776 which connects first to an influent connection 732 of an electrically controlled valve 730, second to a cold water tap 724 and third to an influent port of water heater 720. Water heater 720 is illustrated as being a standard electrical water heater of any desired size, with effluent connection to a hot water tap 722. Taps 724 and 722 are located above a sink 830 which provides a workplace for filling and preparing containers of wash solution and the like. Sink 830 comprises a flexible drain hose 832 made from one and one-half inch pliable synthetic resinous material tubing disposed from the sink drain to a convenient outlet point below the sink where water drains directly upon the floor 980 to further flow with other liquids to be recycled into sump 750.

Electrically controlled two way valve 730 is conditionally operated by a two position, manually operated rotary switch 530 which selects between liquids available from either rinse tank 790 or recirculation tank 780. Two way valve 730 provides influent flow from either rinse tank 790 through influent port 732 and output port 656 or recirculation tank 780 through influent port 734 and output port 736. A liquid presence sensor 728 is in-line between two way valve 730 and a high pressure pump 710 as a safe guard against inadequate fluid flow from the upstream sources which would could lead to overheating and ultimate burn-out of pump 710. If liquid presence sensor 728 detects no liquid and pump 710 is ON, power to pump 710 is removed and an alarm is sounded.

As a safe guard against excess use of rinse water and to remove the possibility of overloading the recirculation system with excess liquid, operation of two way valve 730 is conditionally controlled by a water level sensor 792 in recirculation tank 780 through valve and pump controller 532. Valve and pump controller 532 is made from standard electrical logical control and audio signal generating components known and available in the art and provides controls for valve 730 and pump 756 as described hereinafter. When switch 530 selects influent and effluent ports 732 and 656 of valve 730, unless recirculation tank comprises adequate empty volume to store the expected ten gallons or less of final rinse, an alarm sounds and two way valve 730 is controllably restrained to provide only source liquid through ports 734 and 736 which communicate with recirculation tank 780. Sensor 792, which is a bi-level sensor, senses a maximum fill point at which centrifugal pump 756 is restricted from operating and a minimum fill point at which access to water through two way valve 730 is conditionally permitted. Thus, when the rotary switch controlling selection between influent from the rinse tank 790 and recirculation tank 780 is thrown to select influent from the rinse tank 790 and sensor 792 detects an inadequate filling volume remaining in recirculation tank 780, an alarm sounds and pump 710 influent continues to be supplied with reclaimed liquids from recirculation tank 780. Since some of the water used in bay 10 is lost to evaporation, the water level in recirculation tank 780 is simply lowered by prerinsing portions of the vehicle using reclaimed and recycled liquids until the preset minimum fill level is reached in recirculation tank 780.

Pump 710 is a high pressure pump. While other high pressure pumps can be selected an used within the scope of the invention, pump 710 is 220 volt single phase high pressure pump, serial number HC 4/1000 distributed by Hydro Engineering, Inc., Salt Lake City, Utah. To save water and energy, the pump is controlled by a high pressure rinse timer switch 140, described above. Pump 710 output connects directly to a high pressure hose and thereby to a retractable reel 900 which comprises a fifty foot hose and hand held wash wand which provide easy access to any portion of a vehicle being cleaned.

As mentioned earlier, recirculation tank 780 comprises a connection to two waY valve and therefrom to pump 710. To further provide for evaporation of the liquid in recirculation tank 780 to guard against tank overfill, recirculation tank 780 comprises another connection to second pump 712 and therethrough to prewash spray arch 714 and undercarriage wash 716 as earlier described. To settle dust and wet the outside and undercarriage of the vehicle preparatory to soaping and otherwise manually applying wash solutions to the exterior of the vehicle, spray timer 22 is set which turns on spray from spray arch 714 and undercarriage wash 716 for a period of approximately 30 seconds while the vehicle is driven into service center 10. As shown in FIG. 2, spray arch 714 comprises a series of nozzles 654 which emit a fine spray of pump 712 pressured liquid from recirculation tank 780 during the thirty second period spray timer 22 provides power to pump 712. Similarly, undercarriage wash 716 positioned centrally in floor 980 midway between ramp abutting edge 676 and the proximal edge of sump 750 provides a circular spray wetting the vehicle undercarriage while spray timer 22 powers pump 712.

It is to be appreciated that each of the two different types of light sources may be selectively turned on and off in such a way as to produce a light mix which provides extraordinary illumination for a vehicle wash station. The lights in question are specialized high-tech quartz halogen light sources and standard fluorescent light sources. The use of the two light sources enhances the surface of the car so that imperfections in washing or cleaning are made readily visible in order that they might be redone and establishes intense lighting at hood level which is optimum for engine cleaning, preferably above 250 foot candles.

It is contemplated that the present invention may, at the option of the buyer, comprise a stereo sound system, preferably comprising an AM/FM radio and/or a compact disc, tape or cassette player. By providing a built-in sound system for the service center, music is provided for worker contentment and the temptation to workers to use the radio or stereo system of a vehicle being serviced is negated, which also eliminates any customer dissatisfaction growing out of the use of customer's vehicle stereo system by those servicing the vehicle.

Before driving a vehicle into bay 42, the spray timer 22 is activated. A fine spray of liquid from recirculation tank 780 is provided through spray arch 714 and a pressurized wash via undercarriage spray 716 which completely surrounds and wets the vehicle as it is slowly driven into the bay. After approximately thirty seconds, spray timer 22 removes power from pump 712 and the manual wash process begins. An operator fills a bucket with water from the hot and cold water taps proportioned to meet personal comfort temperature levels. A detergent, such as AutoGlym #14A, is added to the bucket of water and the liquids are well mixed to provide a wash solution. The wash solution is applied by soft sponge, a cotton cloth or mitt or the like. The wheels are cleaned using No. 7 and various brushes to remove grime and baked on disc brake dust.

When difficult to clean areas are encountered, switch 894B is turned on supplying pump pressured road grime cleaner to road grime hose and nozzle 882. Retractable hose and nozzle 882 are taken to the site to be cleaned, tube 898B is held a distance of six to twelve inches from the area where difficult grime is to be removed and trigger release handle is depressed supplying a spray of moderate velocity out of tube 898B. Spraying is continued until the target area is totally wetted; at which time, the trigger is released and either a second site is similarly approached and treated or the hose and nozzle 882 are retracted to storage in reel 880 and switch 894B is turned off. The cleaned areas are then immediately rinsed as earlier described.

Similarly, engine cleaning is performed by raising the engine protective hood of the vehicle and turning on switch 894A. Hose and nozzle assembly 886 are displaced to the area of the engine and handle 890 is depressed while engine cleaner is dispensed as a moderate velocity spray or flow out of tube 898A. The engine is bathed with engine cleaner as necessary to remove engine grease and the like from the engine and related parts. Brushes are used as necessary. When the engine cleaning process is complete, hose and nozzle 886 are retracted into reel 884 for storage and switch 894A is turned off and the engine parts are rinsed as described above. Then No. 19 is used under the hood and in the engine compartment to remove road film and other residue not penetrated by No. 6 engine cleaner, then rinsed again.

When desired for more rapid vehicle drying or for personal cooling, each of the two fans 594 located at the upper rear corners of service center 10 are turned on by a switch 26 which is located in the immediate vicinity of each associated fan 594 . Drying is be accomplished by evaporation, chamois wiping, and by use of blow dryer 970. Chamois wringer 724 is periodically employed to wring excess water from each chamois after use. Alternatively, blow dryer nozzle 974 is retrieved from nozzle stand 976, dryer switch 978 is turned on, and the heated air from blow dryer 970 is directed across the surface to be dried. When finished nozzle 974 is returned to stand 976 and switch 978 is turned off.

High intensity halogen lights 340 are involved in final inspection for poorly cleaned areas on the vehicle and engine. All of the halogen lights 340 are turned on by a single switch and turned off when the inspection is complete. Excess water is blown from the joints, cracks, and other hard to access places of the vehicle using high pressure air from air compressor 470 and available from air hose valve 478 via retractable hose unit 476.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A manual, portable, self-contained vehicle washing and cleaning center comprising;
   three dimensional free-standing open framework means defining an unobstructed axially-accessible vehicle-receiving compartment, the framework means comprising a plurality of frame means and longitudinal brace members, said brace members structurally interconnecting said frame means, each frame means comprising at least one column member on each side of the compartment, at least one beam member transversely bridging between the associated columns on each side of the compartment;
   the framework means further comprising bearing means which rest unattached on the ground, floor or pavement and are associated with the lower end of at least some column member in load-transferring relation;
   source means of at least one influent wash liquid;
   means for selective controlled delivering said at least one influent wash liquid under pressure from the source to at least one discharge site within the framework means;
   drainage means by which discharged liquid is collected;
   means receiving and recycling the collected liquid whereby substantially all collected liquid is reclaimed for subsequent use by the center.

2. A center according to claim 1 further comprising means in which equipment is stored comprising an enclosed, splash free space.

3. A center according to claim 1 further comprising lighting means carried by the framework means comprising selectively illuminable light source means and means which directionally cause the light source means to illuminate the compartment.

4. A center according to claim 1 wherein the drainage means are free-standing.

5. A vehicle washing and cleaning center according to claim 1 wherein the framework means defining the vehicle-receiving compartment are open at both ends for one way ingress and egress.

6. A vehicle washing and cleaning center according to claim 1 wherein the framework means defining the vehicle-receiving compartment are open at one end for two way vehicle ingress and egress.

7. A vehicle washing and cleaning center according to claim 1 wherein each frame means is disposed in a transverse vertical plane and comprises one column member on each side of the compartment each disposed respectively in two essentially parallel longitudinal vertical planes and one beam member spanning between each two adjacent column members within each longitudinal vertical plane.

8. A vehicle washing and cleaning center according to claim 1 wherein further axially-directed beam means spanning between and connected to each two adjacent frame means and said further axially-directed beam means are transversely connected by at least one transverse beam member means.

9. A vehicle washing and cleaning center according to claim 1 wherein each frame means is generally U-shaped and each column member is joined to the associated beam member by 90 degree structural corner elbow means.

10. A vehicle washing and cleaning center according to claim 1 wherein the bearing means comprise load-transmitting bearing plate means disposed beneath each column member.

11. A vehicle washing and cleaning center according to claim 1 further comprising lighting means comprising a plurality of distinct light sources which, taken together, provide for improved illumination of a vehicle disposed within the compartment and any poorly washed and cleaned spots on the vehicle.

12. A vehicle washing and cleaning center according to claim 11 wherein the plurality of distinct light sources comprise at least one source of fluorescent lighting and at least one halogen source of lighting.

13. A vehicle washing and cleaning center according to claim 1 further comprising light source means carried by at least some of the beam members and brace members, the light source means being downwardly directionally oriented to illuminated the top, trunk, hood, and engine, when the hood is open, of a vehicle in the compartment.

14. A vehicle washing and cleaning center according to claim 1 further comprising cabinet means disposed adjacent to the frame means for storage of equipment and supplies.

15. A vehicle washing and cleaning center according to claim 14 further comprising cabinetry means comprising a sink and drain tray means.

16. A vehicle washing and cleaning center according to claim 15 wherein the sink and drain tray means comprise means for wringing liquid from a chamois and like drying material.

17. A vehicle washing and cleaning center according to claim 15 wherein the cabinetry means comprises surface means comprising holding means where chamois and other drying material are hung to dry.

18. A vehicle washing and cleaning center according to claim 15 wherein the sink and drain tray means comprise drain means which drains to the drainage means.

19. A vehicle washing and cleaning center according to claim 14 wherein the cabinet means comprise at least one free-standing cabinet.

20. A vehicle washing and cleaning center according to claim 14 wherein the cabinet means comprises a plurality of cabinets each having a front, the front of at least one cabinet comprises a raised base such that liquids drip or flow directional into the drainage means.

21. A vehicle washing and cleaning center according to claim 14 wherein the cabinet means comprise a plurality of cabinets, at least one of the cabinets being modular.

22. A vehicle washing and cleaning center according to claim 1 further comprising lighting means comprising at least one halogen light source carried by the framework means adjacent at least one of the beam means.

23. A vehicle washing and cleaning center according to claim 1 further comprising lighting means comprise switching means by which the intensity of the lighting means is selectively adjusted.

24. A vehicle washing and cleaning center according to claim 1 further comprising a source of electrical energy.

25. A vehicle washing and cleaning center according to claim 24 wherein the source of the electrical energy comprises an electrical box and conductor means spanning between the electrical box and an existing conventional source of electricity.

26. A vehicle washing and cleaning center according to claim 24 wherein the source of electrical energy comprises wiring means routed through the framework means and connecting to a plurality of outlets.

27. A vehicle washing and cleaning center according to claim 26 wherein the wiring means comprise at least one timer which when actuated turns on available power and which resets and turns off power after a predetermined time for energy and water conservation.

28. A vehicle washing and cleaning center according to claim 27 wherein the wiring means comprise at least two switching means connected in parallel and used to actuate the at least one timer.

29. A vehicle washing and cleaning center according to claim 28 wherein the switching means are placed at various places of convenient access such that power can be readily restored when a timer resets.

30. A vehicle washing and cleaning center according to claim 1 further comprising at least two fan means carried by the framework means which are directed to blow in substantially the same direction and by which the fumes and odors are blown from the compartment and vehicle surfaces and personnel are cooled.

31. A vehicle washing and cleaning center according to claim 30 wherein the compartment comprises corners and the fan means are disposed at rear top locations at the corners of the compartment.

32. A vehicle washing and cleaning center according to claim 1 further comprising air compressor means comprising at least one air outlet carried by retractable reel means.

33. A vehicle washing and cleaning center according to claim 1 further comprising external covering structure carried by the framework means.

34. A vehicle washing and cleaning center according to claim 1 wherein the influent wash liquid source means comprises liquid container storage means, wherein the selectively controlled delivery means comprises pressure generating means, liquid communication means and means for delivering wash liquid under pressure from the liquid communication means.

35. A vehicle washing and cleaning center according to claim 34 wherein the pressure generating means comprise at least one pump.

36. A vehicle washing and cleaning center according to claim 34 wherein the selectively controlled delivery means comprises pressurized aqueous rinse means further comprising associated retractable hose and nozzle means carried by the framework means by which manual spraying and rinsing of the entire exterior of a vehicle is accommodated.

37. A vehicle washing and cleaning center according to claim 34 wherein the selectively controlled delivery means comprises pressurized road grime solvent means further comprising associated retractable hose and nozzle means by which difficult to remove road grime is spot sprayed for facile removal from the exterior of a vehicle.

38. A vehicle washing and cleaning center according to claim 34 wherein the selectively controlled delivery means comprise pressurized engine cleaner means further comprising associated retractable hose and nozzle means by which solvent is applied to an engine of a vehicle for facile cleaning.

39. A vehicle washing and cleaning center according to claim 34 wherein the influent wash liquid source means comprise a water heater.

40. A vehicle washing and cleaning center according to claim 34 wherein the selectively controlled delivery means comprise hot and cold water taps at a sink.

41. A vehicle washing and cleaning center according to claim 1 wherein the means for recycling liquids comprise lightweight flooring means which fills the floor or ground space inside the compartment, processing and separation means whereby liquid is prepared for subsequent use, and liquid return means whereby liquid is returned for use.

42. A vehicle washing and cleaning center according to claim 41 wherein lightweight flooring means comprise wooden members which provide a raised liquid catching surface which comprises a density of about ten percent of concrete.

43. A vehicle washing and cleaning center according to claim 41 wherein the flooring means further comprise raised edges, a sump means for liquid collection which is disposed centrally from the raised edges, and a surface which slants from the edges to the sump such that liquid is urged inward to flow into said sump.

44. A vehicle washing and cleaning center according to claim 43 wherein the flooring means further comprise a grating to cover said sump means.

45. A vehicle washing and cleaning center according to claim 43 wherein the flooring means comprise liquid communication means which provides a pathway for liquid captured by the sump means to flow to the processing and separation means.

46. A vehicle washing and cleaning center according to claim 45 wherein the sump means comprises baffle means which separate waste particulate matter from liquids which flow therethrough to liquid communication means.

47. A vehicle washing and cleaning center according to claim 41 wherein lightweight flooring means comprise wooden members providing a raised liquid catching surface.

48. A vehicle washing and cleaning center according to claim 41 wherein the means for recycling liquids further comprise curtain means, supported by the framework means, which catch and contain sprayed and splashed liquids emanating from the means for delivering at least one wash liquid and from which liquids drain to the flooring means.

49. A vehicle washing and cleaning center according to claim 48 wherein curtain means comprise inwardly disposed top and bottom edges which catch and urge fluids toward the flooring means.

50. A vehicle washing and cleaning center according to claim 1 wherein means for recycling liquids comprise balancing means whereby the volume of influent fresh water is balanced against storage and processing volume of recycled liquid whereby the means for recycling liquids is not overloaded.

51. A vehicle washing and cleaning center according to claim 1 wherein means for recycling liquids comprise selection means whereby fresh water and recycled water are preselected such that excess use of fresh water and the excess storage of recycled liquid is minimized.

52. A vehicle washing and cleaning center according to claim 1 wherein means for recycling liquids comprise means for separating contaminants from effluents emanating from a bay in use whereby recovered liquids are reused and contaminants are removed for disposal 53. A manual, portable, self-contained vehicle washing and cleaning center comprising:
- three dimensional free-standing open framework means defining an unobstructed axially-accessible vehicle-receiving compartment, the framework means comprising a plurality of frame means and longitudinal brace members, said brace members structurally interconnecting said frame means, each frame means comprising at least one column member on each side of the compartment, at least one beam member transversely bridging between the associated columns on each side of the compartment;
- the framework means further comprising bearing means which rest unattached on the ground, floor or pavement and are associated with the lower end of at least some column member in load-transferring relation;
- a source of at least one influent wash liquid associated within the framework means;
- manual means for selectively receiving wash liquid from the said source and discharging said received wash liquid upon a vehicle within the framework means; and
- free-standing drainage means at a low elevation within the framework means which collects discharged wash liquid for subsequent handling.

54. A center according to claim 53 further comprising means receiving the collected wash liquid from the drainage means and recycling said liquid for subsequent use at the center as influent wash liquid.

55. A water and energy efficient manual, portable, self-contained vehicle washing and cleaning center comprising:
- three dimensional free-standing open framework means defining an unobstructed axially-accessible vehicle-receiving compartment, the framework means comprising a plurality of frame mean and longitudinal brace members, said brace members structurally interconnecting said frame means, each frame means comprising at least one column member on each side of the compartment, at least one beam member transversely bridging between the associated columns on each side of the compartment;
- the framework means further comprising bearing means which rest unattached on the ground, floor or pavement and are associated with the lower end of at least some column member in load-transferring relation;
- source means selectively supplying influent wash liquid under pressure;
- means for selectively controlling delivering the influent wash liquid under pressure from the source means;
- means for collecting and recycling spent wash liquid whereby said liquid is reclaimed for subsequent use at the center as recycled influent wash liquid.

56. A center according to claim 55 further comprising means for automatically terminating delivering of wash liquid after a predetermined time.

57. A lightweight manual, portable, self-contained vehicle washing and cleaning center comprising:
- three dimensional free-standing open framework means defining an unobstructed axially-accessible vehicle-receiving compartment, the framework means comprising a plurality of frame means and longitudinal brace members, said brace members structurally interconnecting said frame means, each frame means comprising at least one column member on each side of the compartment, at least one beam member transversely bridging between the associated columns on each side of the compartment;
- the framework means further comprising bearing means which rest unattached on the ground, floor or pavement and are associated with the lower end of at least some column member in load-transferring relation;
- means for manually controllably delivering pressurized influent wash liquid from a source to a vehicle within the framework means;
- means for collecting and recycling spent wash liquid, whereby spent wash liquid is reclaimed for subsequent use of the center as influent wash liquid 58. A center according to claim 57 wherein the collecting and recycling means comprise free-standing lightweight floor drainage means.

59. A center according to claim 57 further comprising lightweight spray and splash containment means carried in a vertical disposition by the framework means.

60. A manual, portable, free-standing vehicle washing and cleaning center comprising:
- three dimensional free-standing open framework means defining an unobstructed axially-accessible vehicle-receiving compartment, the framework means comprising a plurality of frame means and longitudinal brace members, said brace members structurally interconnecting said frame means, each frame means comprising at least one column member on each side of the compartment, at least one beam member transversely bridging between the associated columns on each side of the compartment;
- the framework means further comprising bearing means which rest unattached on the ground, floor or pavement and are associated with the lower end of at least some column member in load-transferring relation;
- means for manually controllably delivering upon a vehicle within the framework means wash liquid from a source disposed at the framework means; and
- free-standing drainage means disposed within the framework means adjacent the bearing means.

61. A center according to claim 60 further comprising lighting means carried by the framework means comprising selectively illuminable light source means and means which directionally cause the source means to illuminate the compartment.

62. A manual, portable, multiple mode, self-contained vehicle washing and cleaning center comprising:
- three dimensional free-standing open framework means defining an unobstructed axially-accessible vehicle-receiving compartment, the framework means comprising a plurality of frame means and longitudinal brace members, said brace members structurally interconnecting said frame means, each frame means comprising at least one column member on each side of the compartment, at least one beam member transversely bridging between the associated columns on each side of the compartment;

the framework means further comprising bearing means which rest unattached on the ground, floor or pavement and are associated with the lower end of at least some column member in load-transferring relation;

a plurality of sources of influent wash liquids, associated with the framework means;

means for manually controllably delivering upon a vehicle within the framework means influent wash liquids from each source; and free-standing means associated within the framework means for collecting and reclaiming spent wash liquids.

* * * * *